United States Patent
Ruiz Coll et al.

(10) Patent No.: US 12,425,612 B2
(45) Date of Patent: Sep. 23, 2025

(54) INTRA BLOCK COPY VECTOR DIFFERENCE WRAP AROUND

(71) Applicant: Ofinno, LLC, Reston, VA (US)

(72) Inventors: Damian Ruiz Coll, Reston, VA (US); Vikas Warudkar, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/399,369

(22) Filed: Dec. 28, 2023

(65) Prior Publication Data
US 2024/0223784 A1    Jul. 4, 2024

Related U.S. Application Data

(60) Provisional application No. 63/435,657, filed on Dec. 28, 2022.

(51) Int. Cl.
H04N 19/176 (2014.01)
H04N 19/119 (2014.01)

(52) U.S. Cl.
CPC ......... H04N 19/176 (2014.11); H04N 19/119 (2014.11)

(58) Field of Classification Search
CPC ..... H04N 19/176; H04N 19/119; H04N 19/52
See application file for complete search history.

(56) References Cited

U.S. PATENT DOCUMENTS

| | | | |
|---|---|---|---|
| 11,317,113 B2 | 4/2022 | Li et al. | |
| 2016/0241858 A1 | 8/2016 | Li et al. | |
| 2021/0360262 A1 | 11/2021 | Li et al. | |
| 2023/0164351 A1* | 5/2023 | Zhao | H04N 19/172 |
| 2023/0217013 A1* | 7/2023 | Nien | H04N 19/593 |
| | | | 375/240.12 |

OTHER PUBLICATIONS

Vivienne Sze et al.; "High Efficiency Video Coding (HEVC)." Integrated circuit and systems, algorithms and architectures. vol. 39. Berlin, Germany: Springer, 2014.

Mathias Wien. "High efficiency video coding." Coding Tools and specification 24 (2015).

JVET-P0669-v3; Joint Video Experts Team (JVET) of ITU-T SG 16 WP 3 and ISO/IEC JTC 1/SC 29/WG 11; 16th Meeting: Geneva, CH, Oct. 1-11, 2019; Title: AHG6: Wrap-around motion vector prediction at the picture boundary; Status: Input document to JVET; Purpose: Proposal; Authors: Minhun Lee et al.; Source: Kwangwoon University (KWU) and ETRI.

(Continued)

*Primary Examiner* — Richard T Torrente
(74) *Attorney, Agent, or Firm* — Willis H. Chang; Kavon Nasabzadeh; Jacob L. Mangan

(57) ABSTRACT

A decoder receives, from a bitstream, an indication of a block vector predictor (BVP) and a first block vector difference (BVD) for a current block. The decoder determines a second BVD based on: the first BVD and whether a location displaced from the current block by a sum of the BVP and the first BVD is outside a reference region. The decoder calculates a block vector (BV) based on a sum of the second BVD and the BVP. The decoder reconstructs the current block based on a reference block indicated by the BV.

20 Claims, 24 Drawing Sheets

(56) References Cited

OTHER PUBLICATIONS

JVET-P1018-v2; Joint Video Experts Team (JVET) of ITU-T SG 16 WP 3 and ISO/IEC JTC 1/SC 29/WG 11; 16th Meeting: Geneva, CH, Oct. 1-11, 2019; Title: Non-CE8: An alternative IBC virtual buffer setting to avoid reference sample wrapping around; Status: Input document to JVET; Purpose: Proposal; Authors: Jizheng Xu et al.; Source: Bytedance Inc. and Tencent.

JVET-T2002-v2; Joint Video Experts Team (JVET) of ITU-T SG 16 WP 3 and ISO/IEC JTC 1/SC 29; 20th Meeting, by teleconference, Oct. 7-16, 2020; Title: Algorithm description for Versatile Video Coding and Test Model 11 (VTM 11); Status: Output document of JVET; Purpose: Algorithm description for Versatile Video Coding and Test Model 11; Authors: Jianle Chen et al.; Source: Editors.

* cited by examiner

The quick brown fox jumps over the lazy dog. The quick brown fox jumps over the lazy dog. The quick brown fox jumps over the lazy dog.

*FIG. 16*

INTRA BLOCK COPY VECTOR DIFFERENCE WRAP AROUND

CROSS-REFERENCE TO RELATED APPLICATIONS

This application claims the benefit of U.S. Provisional Application No. 63/435,657, filed Dec. 28, 2022, which is hereby incorporated by reference in its entirety.

BRIEF DESCRIPTION OF THE DRAWINGS

Some features are shown by way of example, and not by limitation, in the accompanying drawings. In the drawings, like numerals reference similar elements.

FIG. 16 shows an example of intra block copy (IBC).

DETAILED DESCRIPTION

Figure 1:
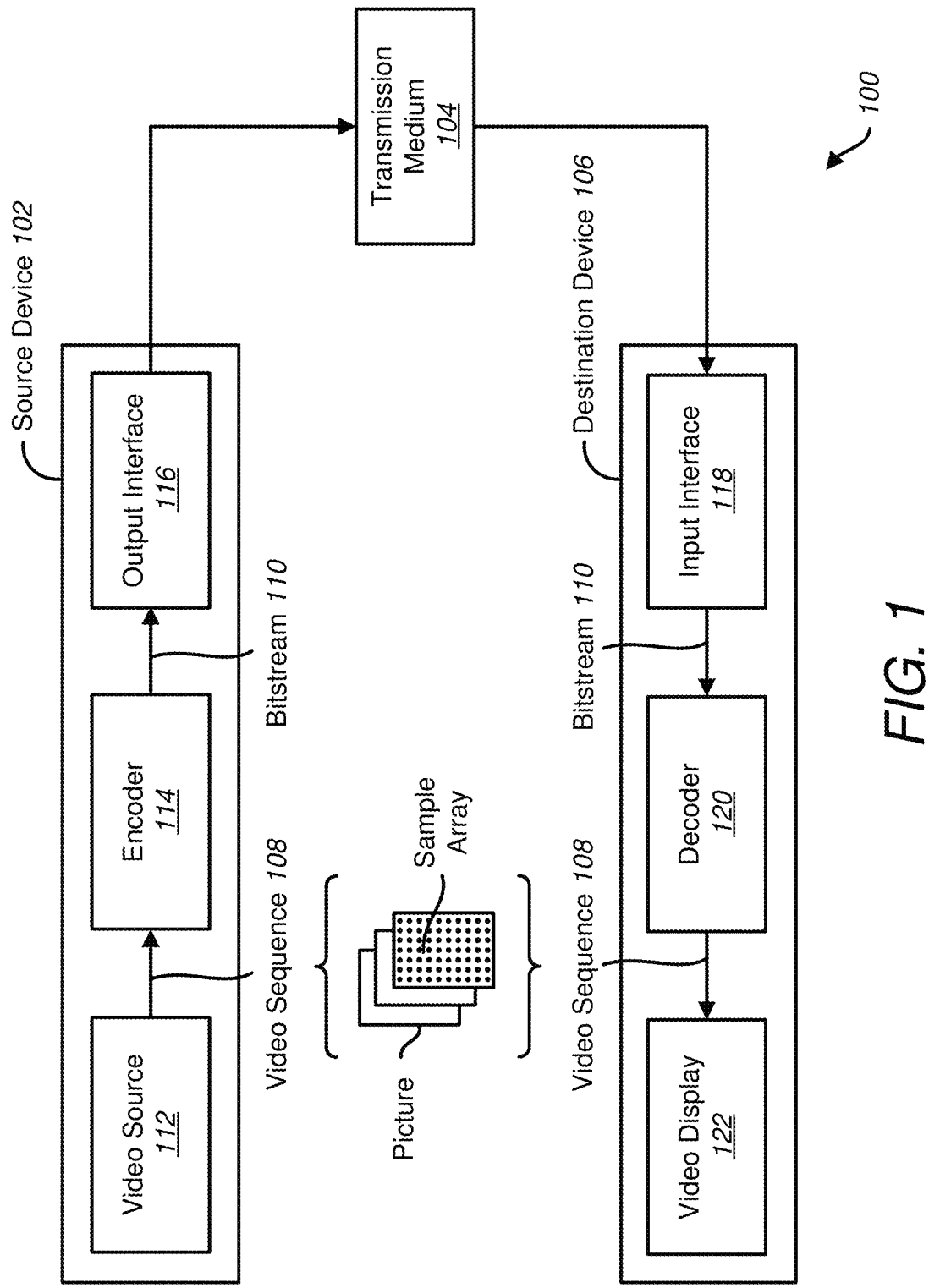
FIG. 1 shows an example video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or send/transmit bitstream 110 to destination device 106 via transmission medium 104. Destination device 106 decodes bitstream 110 to display video sequence 108. Destination device 106 may receive bitstream 110 from source device 102 via transmission medium 104. Source device 102 and/or destination device 106 may be any of a plurality of different devices (e.g., a desktop computer, laptop computer, tablet computer, smart phone, wearable device, television, camera, video gaming console, set-top box, video streaming device, etc.).

Source device 102 may comprise (e.g., for encoding video sequence 108 into bitstream 110) one or more of a video source 112, an encoder 114, and/or an output interface 116. Video source 112 may provide and/or generate video sequence 108 based on a capture of a natural scene and/or a synthetically generated scene. A synthetically generated scene may be a scene comprising computer generated graphics and/or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays (e.g., three sample arrays are used for one luma component and two chroma components, respectively) used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

Encoder 114 may encode video sequence 108 into bitstream 110. Encoder 114 may apply/use (e.g., to encode video sequence 108) one or more prediction techniques to reduce redundant information in video sequence 108. Redundant information is information that may be predicted at a decoder and need not be transmitted to the decoder for accurate decoding of video sequence 108. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Encoder 114 may partition pictures comprising video sequence 108 into rectangular regions referred to as blocks, for example, before applying one or more prediction techniques. Encoder 114 may then encode a block using the one or more of the prediction techniques.

For temporal prediction, encoder 114 may search for a block similar to the block being encoded in another picture (e.g., referred to as a reference picture) of video sequence 108. The block determined during the search (e.g., referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (e.g., also referred to as a residual) based on the difference between a block being encoded and a prediction block. The prediction error may represent non-redundant information that may be sent/transmitted to a decoder for accurate decoding of video sequence 108.

Encoder 114 may apply a transform to the prediction error (e.g. using a discrete cosine transform (DCT), or any other transform) to generate transform coefficients. Encoder 114 may form bitstream 110 based on the transform coefficients and other information used to determine prediction blocks using/based on prediction types, motion vectors, and/or prediction modes. Encoder 114 may perform one or more of quantization and entropy coding of the transform coefficients and/or the other information used to determine the prediction blocks, for example, before forming bitstream 110. The quantization and/or the entropy coding may further reduce the quantity of bits needed to store and/or transmit video sequence 108.

Output interface 116 may be configured to write and/or store bitstream 110 onto transmission medium 104 for transmission to destination device 106. In addition or alternatively, output interface 116 may be configured to send/ transmit, upload, and/or stream bitstream 110 to destination device 106 via transmission medium 104. Output interface 116 may comprise a wired and/or a wireless transmitter configured to send/transmit, upload, and/or stream bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

Transmission medium 104 may comprise wireless, wired, and/or computer readable medium. For example, transmission medium 104 may comprise one or more wires, cables, air interfaces, optical discs, flash memory, and/or magnetic memory. In addition or alternatively, transmission medium 104 may comprise one or more networks (e.g., the internet) or file servers configured to store and/or send/transmit encoded video data.

Destination device 106 may decode bitstream 110 into video sequence 108 for display. Destination device 106 may comprise one or more of an input interface 118, a decoder 120, and/or a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or a wireless receiver configured to receive, download, and/or stream bitstream 110 in accordance with one or more proprietary, open-source, standardized communication protocols, and/or any other communication protocol (e.g., such as referenced herein).

Decoder 120 may decode video sequence 108 from encoded bitstream 110. The decoder 120 may generate prediction blocks for pictures of video sequence 108 in a similar manner as encoder 114 and determine the prediction errors for the blocks, for example, to decode video sequence 108. Decoder 120 may generate the prediction blocks using/based on prediction types, prediction modes, and/or motion vectors received in bitstream 110. Decoder 120 may determine the prediction errors using the transform coefficients received in bitstream 110. Decoder 120 may determine the prediction errors by weighting transform basis functions using the transform coefficients. Decoder 120 may combine the prediction blocks and the prediction errors to decode video sequence 108. Video sequence 108 at the destination device 106 may be, or may not necessarily be, the same video sequence sent, such as video sequence 108 as sent by the source device 102. Decoder 120 may decode a video sequence that approximates video sequence 108, for example, because of lossy compression of video sequence 108 by encoder 114 and/or errors introduced into encoded bitstream 110 during transmission to destination device 106.

Video display 122 may display video sequence 108 to a user. Video display 122 may comprise a cathode rate tube (CRT) display, a liquid crystal display (LCD), a plasma display, a light emitting diode (LED) display, and/or any other display device suitable for displaying video sequence 108.

Video coding/decoding system 100 is merely an example and video encoding/decoding systems different from the video coding/decoding system 100 and/or modified versions of the video coding/decoding system 100 may similarly perform the methods and processes as described herein. For example, the video coding/decoding system 100 may comprise other components and/or arrangements. For example, video source 112 may be external to source device 102. Similarly, video display 122 may be external to destination device 106 or omitted altogether (e.g., if video sequence 108 is intended for consumption by a machine and/or storage device). In an example, source device 102 may further comprise a video decoder and destination device 106 may further comprise a video encoder. For example, source device 102 may be configured to further receive an encoded bitstream from destination device 106 to support two-way video transmission between the devices.

Encoder 114 and/or decoder 120 may operate according to one or more proprietary or industry video coding standards. For example, encoder 114 and/or decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
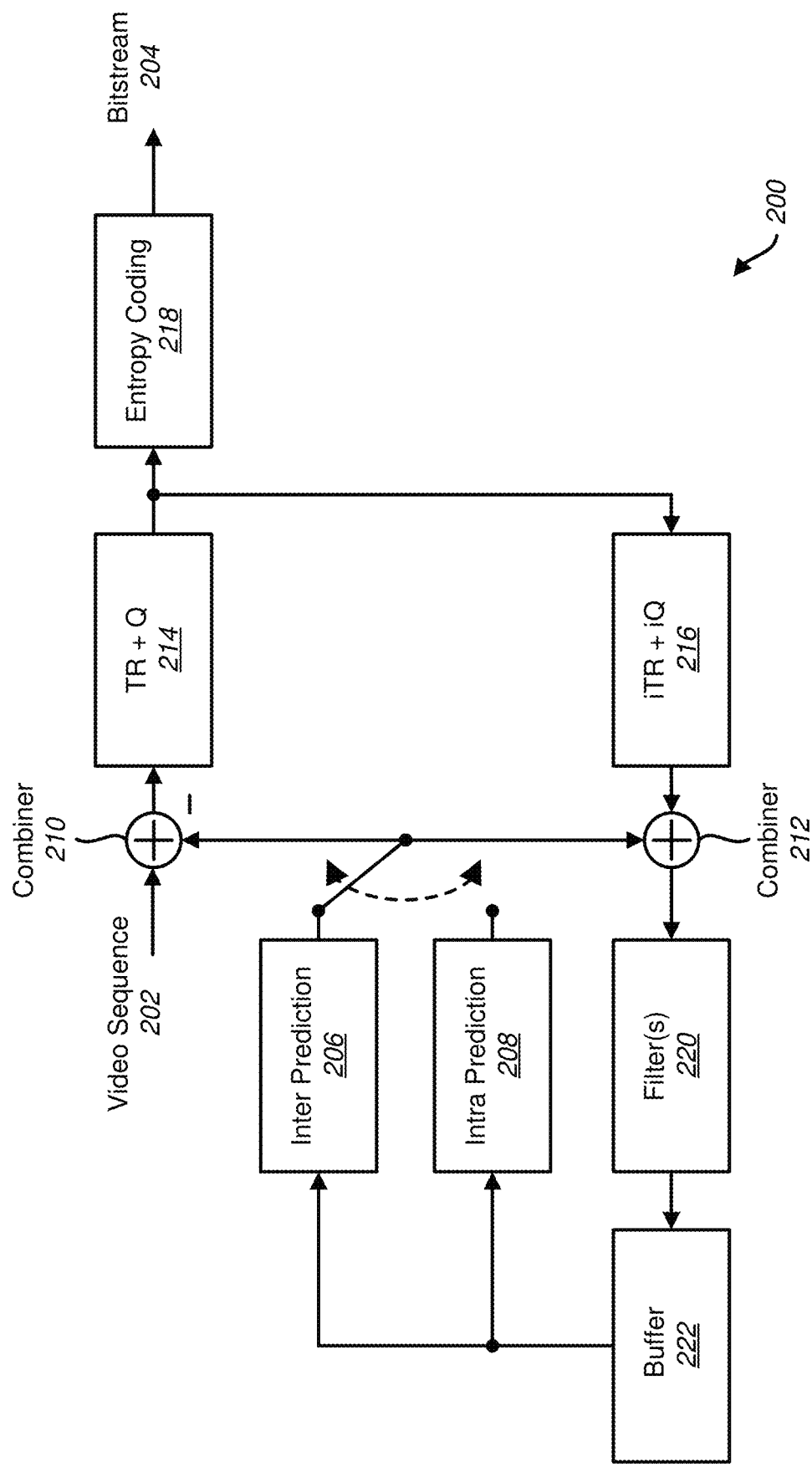
FIG. 2 shows an example encoder in which embodiments of the present disclosure may be implemented.

FIG. 2 shows an example encoder. Encoder 200 as shown in FIG. 2 may implement one or more processes described herein. Encoder 200 may encode a video sequence 202 into a bitstream 204 for more efficient storage and/or transmission. Encoder 200 may be implemented in video coding/decoding system 100 as shown in FIG. 1 (e.g., as encoder 114) or in any computing, communication, or electronic device (e.g., desktop computer, laptop computer, tablet computer, smart phone, wearable device, television, camera, video gaming console, set-top box, video streaming device, etc.). Encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

Encoder 200 may partition pictures (e.g., frames) of (e.g., comprising) video sequence 202 into blocks and encode video sequence 202 on a block-by-block basis. Encoder 200 may perform/apply a prediction technique on a block being encoded using either inter prediction unit 206 or intra prediction unit 208. Inter prediction unit 206 may perform inter prediction by searching for a block similar to the block being encoded in another, reconstructed picture (e.g., a reference picture) of video sequence 202. A reconstructed picture refers to a picture that was encoded and then decoded. The block determined during the search (e.g., referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion and/or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

Combiner 210 may determine a prediction error (e.g., referred to as a residual) based on the difference between the block being encoded and the prediction block. The prediction error may represent non-redundant information that may be sent/transmitted to a decoder for accurate decoding of video sequence 202.

Transform and quantization unit (TR+Q) 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. The irrelevant information refers to information that may be removed from the coefficients without producing visible and/or perceptible distortion in video sequence 202 after decoding (e.g., at a receiving device).

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form bitstream 204.

Inverse transform and quantization unit (iTR+iQ) 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block, for example, using a deblocking filter and/or a sample-adaptive offset (SAO) filter. Buffer 222 may store the reconstructed block for prediction of one or more other blocks in the same and/or different picture of video sequence 202.

Encoder 200 may further comprise an encoder control unit. The encoder control unit may be configured to control one or more units of encoder 200 as shown in FIG. 2. The encoder control unit may control the one or more units of encoder 200 such that bitstream 204 may be generated in conformance with the requirements of one or more proprietary coding protocols, industry video coding standards, and/or any other video cording protocol. For example, the encoder control unit may control the one or more units of encoder 200 such that bitstream 204 may be generated in conformance with one or more of ITU-T H.263, AVC, HEVC, VVC, VP8, VP9, AV1, and/or any other video coding standard/format.

The encoder control unit may be configured to attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may be configured to attempt to minimize or reduce the bitrate of bitstream 204 such that the reconstructed video quality does not fall below a certain level/threshold, and/or to maximize or increase the reconstructed video quality such that the bitrate of bitstream 204 does not exceed a certain level/threshold. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and/or one or more transform types and/or quantization parameters applied by transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to entropy coding unit 218 to be further compressed (e.g., to reduce the bitrate). For example, entropy coding unit 218 may apply context adaptive variable length coding (CAVLC), context adaptive binary arithmetic coding (CABAC), and/or syntax-based context-based binary arithmetic coding (SBAC) to achieve further compression. The prediction type, prediction information, and/or transform and/or quantization parameters may be packed with the prediction error to form bitstream 204.

Encoder 200 is merely an example and encoders different from encoder 200 and/or modified versions of encoder 200 may perform the methods and processes as described herein. For example, encoder 200 may comprise other components and/or arrangements. One or more of the components shown in FIG. 2 may be optionally included in encoder 200 (e.g., entropy coding unit 218 and/or filters(s) 220).

Figure 3:
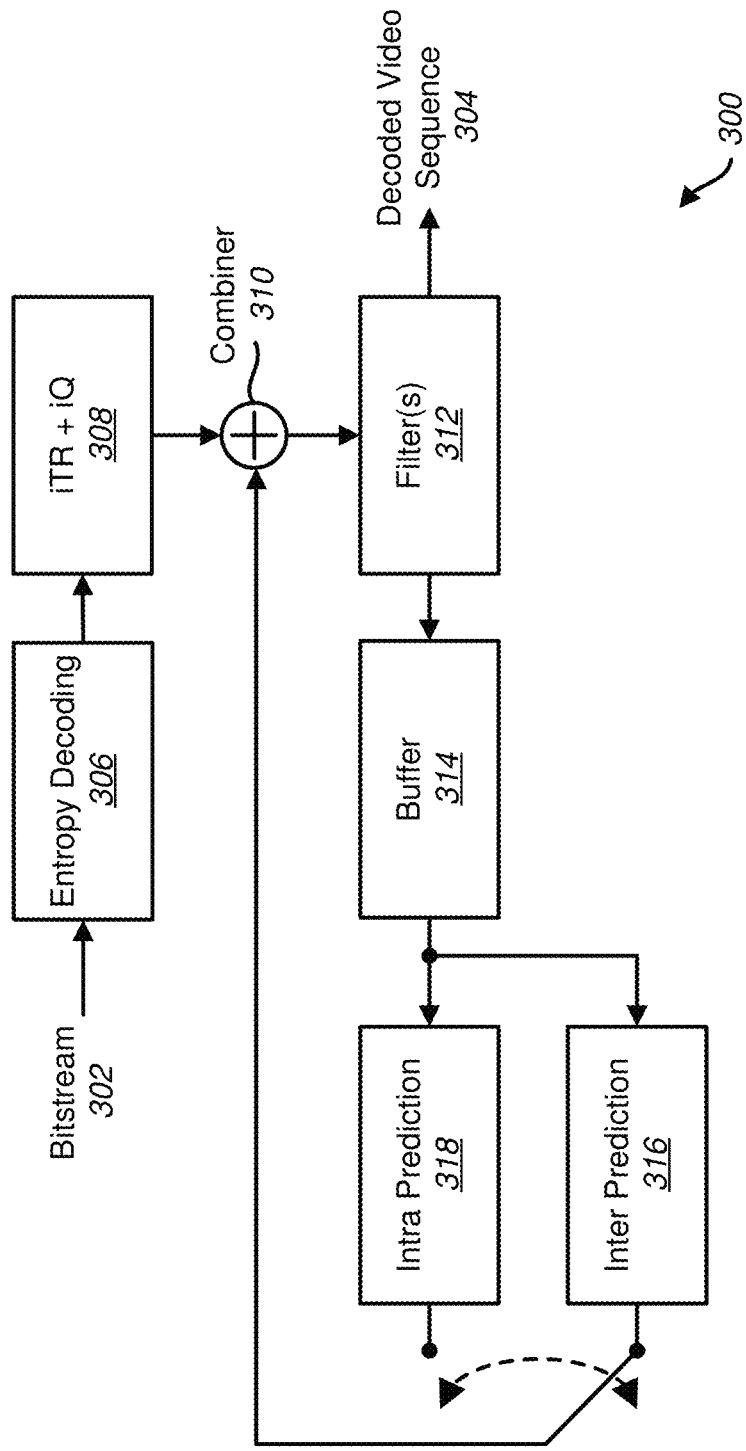
FIG. 3 shows an example decoder in which embodiments of the present disclosure may be implemented.

FIG. 3 shows an example decoder. A decoder 300 as shown in FIG. 3 may implement one or more processes described herein. Decoder 300 may decode a bitstream 302 into a decoded video sequence 304 for display and/or some other form of consumption. Decoder 300 may be implemented in video coding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). Decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

Decoder 300 may comprise a decoder control unit configured to control one or more units of decoder 300. The decoder control unit may control the one or more units of decoder 300 such that bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and/or one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bitstream 302. For example, entropy decoding unit 306 may apply context adaptive variable length coding (CAVLC), context adaptive binary arithmetic coding (CABAC), and syntax-based context-based binary arithmetic coding (SBAC) to decompress the prediction type used to encode a block (intra or inter prediction), prediction information of the block (intra prediction mode if intra predicted, motion vector, etc.), and transform and quantization parameters. Inverse transform and quantization unit 308 may inverse quantize and/or inverse transform the quantized transform coefficients to determine a decoded prediction error. Combiner 310 may combine the decoded prediction error with a prediction block to form a decoded block. The prediction block may be generated by intra prediction unit 318 or inter prediction unit 316 (e.g., as described above with respect to encoder 200 in FIG. 2). Filter(s) 312 may filter the decoded block, for example, using a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

Decoder 300 is merely an example and decoders different from decoder 300 and/or modified versions of decoder 300 may perform the methods and processes as described herein. For example, decoder 300 may have other components and/or arrangements. One or more of the components shown in FIG. 3 may be optionally included in decoder 300 (e.g., entropy decoding unit 306 and/or filters(s) 312).

Although not shown in FIGS. 2 and 3, each of encoder 200 and decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
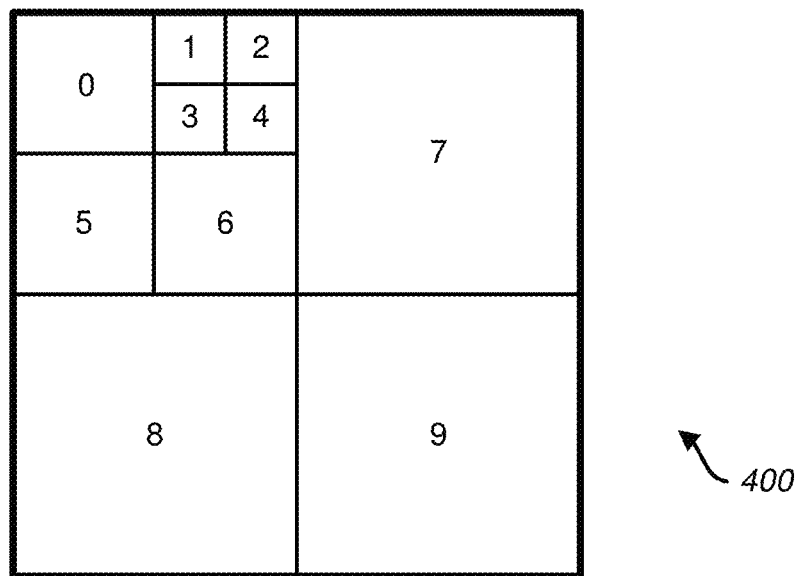
FIG. 4 shows an example quadtree partitioning of a coding tree block (CTB).
Figure 5:
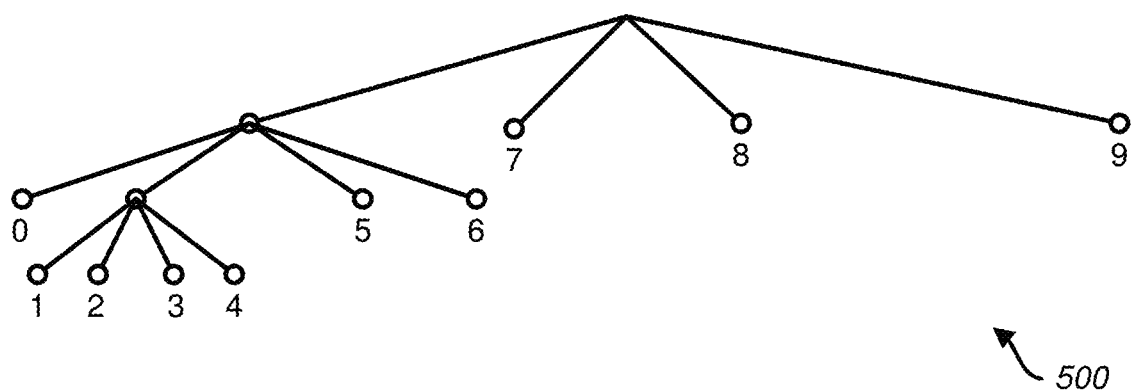
FIG. 5 shows an example quadtree corresponding to the example quadtree partitioning of the CTB in FIG. 4.

FIG. 4 shows an example quadtree partitioning of a CTB 400. FIG. 5 shows an example quadtree 500 corresponding to the example quadtree partitioning of CTB 400 in FIG. 4. As shown in the examples of FIGS. 4 and 5, CTB 400 may first be partitioned into four CBs of half vertical and half horizontal size. Three of the resulting CBs of the first level partitioning of CTB 400 are leaf CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, The non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

The example CTB 400 of FIG. 4 is partitioned into 10 leaf CBs respectively labeled 0-9, but may be partitioned into other quantities of leaf CBs. The 10 leaf CBs may correspond to 10 CB leaf nodes (e.g., 10 CB leaf nodes of quadtree 500 as shown in FIG. 5). In other examples, a CTB may be partitioned into a different number of leaf CBs. The resulting quadtree partitioning of CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
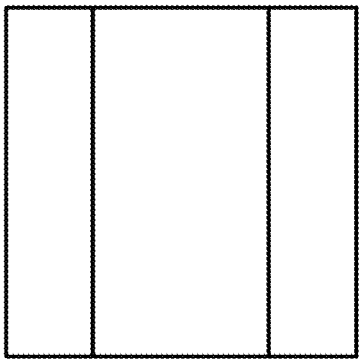
FIG. 6 show examples of binary tree and ternary tree partitions.
Figure 6:
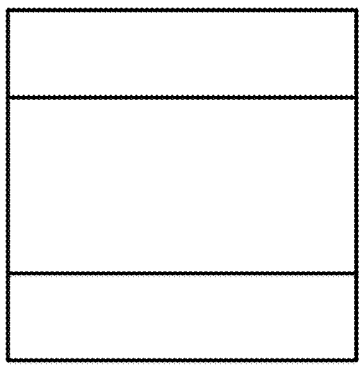
Figure 6:
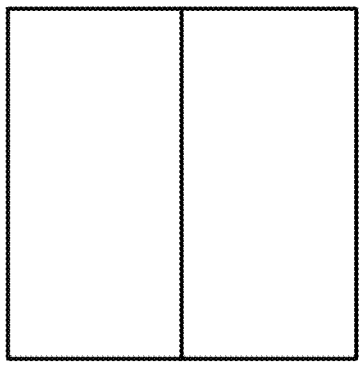
Figure 6:
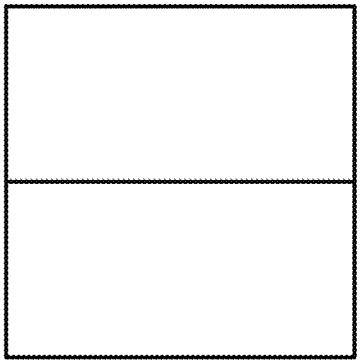

FIG. 6 shows example binary tree and ternary tree partitions. A binary tree partition may divide a parent block in half in either a vertical direction 602 or a horizontal direction 604. The resulting partitions may be half in size as compared to the parent block. In other examples, the resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
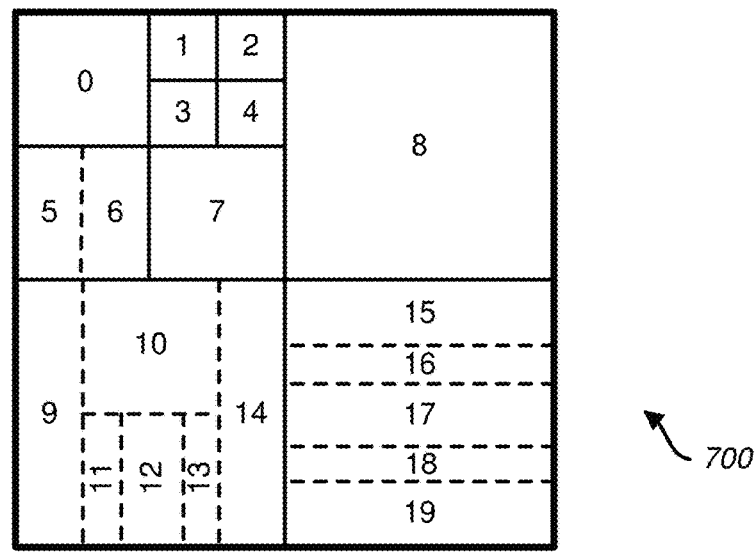
FIG. 7 shows an example of combined quadtree and multi-type tree partitioning of a CTB.
Figure 8:
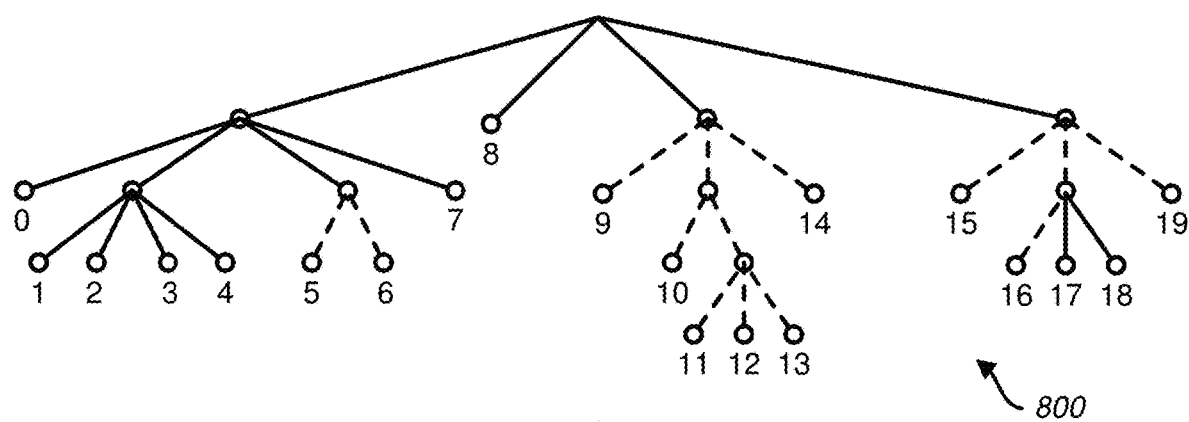
FIG. 8 shows an example tree corresponding to the combined quadtree and multi-type tree partitioning of the CTB shown in FIG. 7.

FIG. 7 shows an example of combined quadtree and multi-type tree partitioning of a CTB 700. FIG. 8 shows an example tree 800 corresponding to the combined quadtree and multi-type tree partitioning of CTB 700 shown in FIG. 7. In both FIGS. 7 and 8, quadtree splits are shown in solid lines and multi-type tree splits are shown in dashed lines. For case of explanation, CTB 700 is shown with the same quadtree partitioning as the CTB 400 described in FIG. 4, and a description of the quadtree partitioning of CTB 700, which is similar to that for CTB 400, is omitted. The quadtree partitioning of the CTB 700 is merely an example and a CTB may be quadtree partitioned in a manner different from the CTB 700. Additional multi-type tree partitions of CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, CTB 700 may be partitioned into 20 leaf CBs respectively labeled 0-19. The 20 leaf CBs may correspond to 20 leaf nodes (e.g., 20 leaf nodes of tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBS, PBS, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bitstream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

In intra prediction, samples of a block to be encoded (e.g., also referred to as a current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., referred to as a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
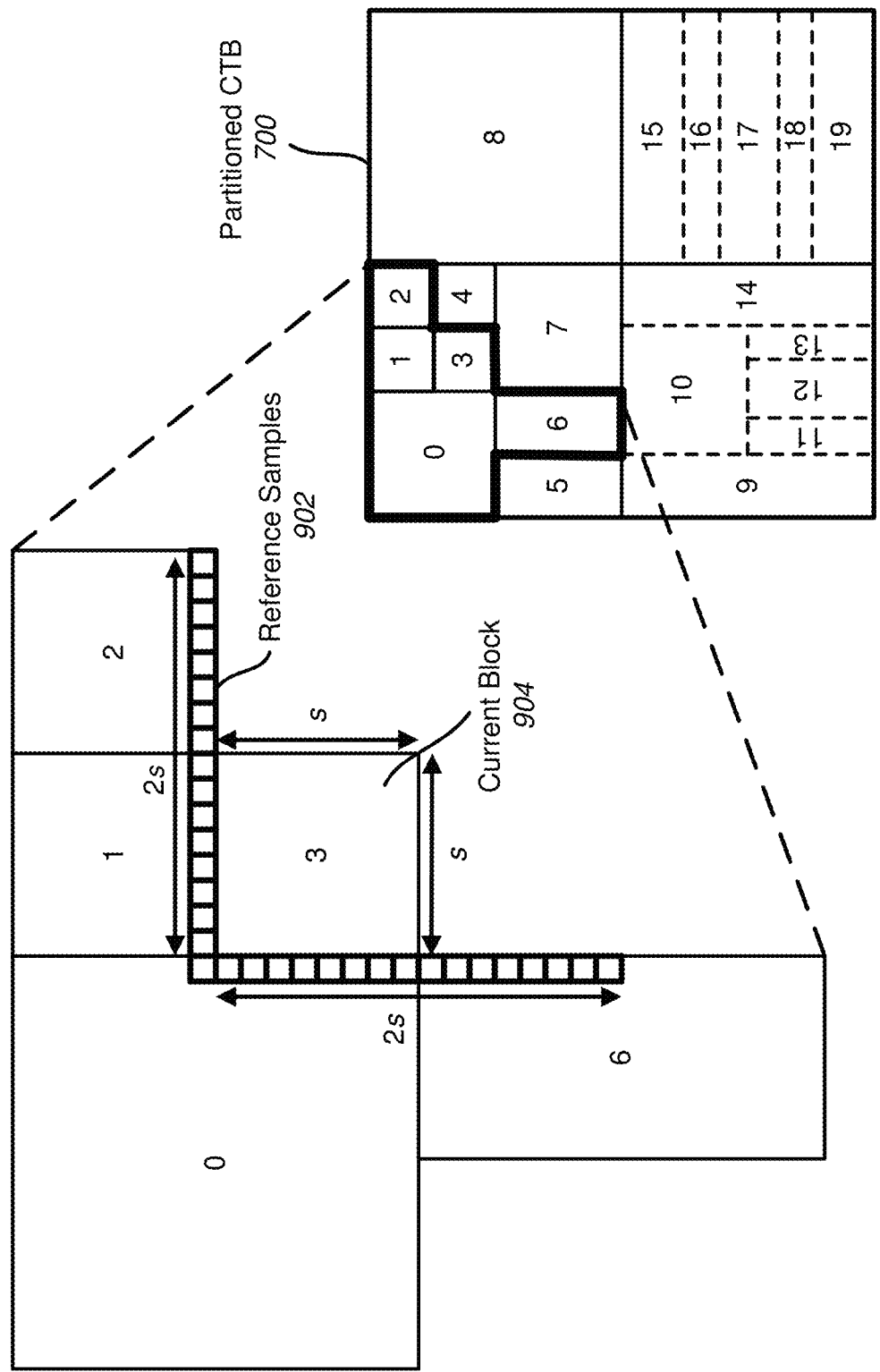
FIG. 9 shows an example set of reference samples determined for intra prediction of a current block.

FIG. 9 shows an example set of reference samples 902 determined for intra prediction of a current block 904. Current block 904 may correspond to a block being encoded and/or decoded. Current block 904 may correspond to block 3 of partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

For current block 904 that is w×h samples in size, reference samples 902 may comprise: 2w samples (or any other quantity of samples) of the row immediately adjacent to the top-most row of current block 904, 2h samples (or any other quantity of samples) of the column immediately adjacent to the left-most column of current block 904, and the top left neighboring corner sample to current block 904. Current block 904 may be square, such that w=h=s. In other examples, a current block need not be square, such that w≠h. Available samples from neighboring blocks of current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. In the example of FIG. 9, samples from neighboring blocks 0, 1, and 2 may be available to construct reference samples 902 given that these blocks are encoded and reconstructed at an encoder and decoded at a decoder prior to coding of current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

In some examples, unavailable samples from reference samples 902 may be filled with one or more of the available reference samples 902. For example, an unavailable reference sample may be filled with a nearest available reference sample. The nearest available reference sample may be determined by moving in a clock-wise direction through reference samples 902 from the position of the unavailable reference. The reference samples 902 may be filled with the mid-value of the dynamic range of the picture being coded, for example, if no reference samples are available.

Reference samples 902 may be filtered based on the size of current block 904 being coded and an applied intra prediction mode. FIG. 9 shows an example determination of reference samples for intra prediction of a block. Reference samples may be determined in a different manner than described above. For example, multiple reference lines may be used in other instances (e.g., in VVC).

Samples of current block 904 may be intra predicted based on reference samples 902, for example, based on (e.g., after) determination and (optionally) filtering of reference samples 902. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
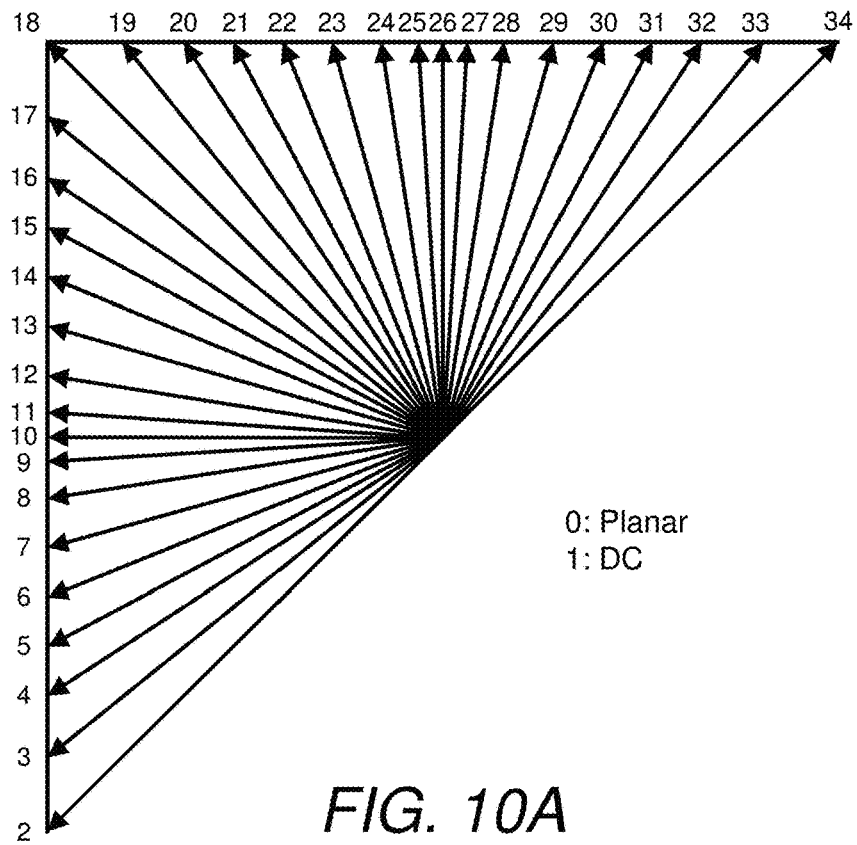
FIGS. 10A and 10B show example intra prediction modes.
Figure 10B:
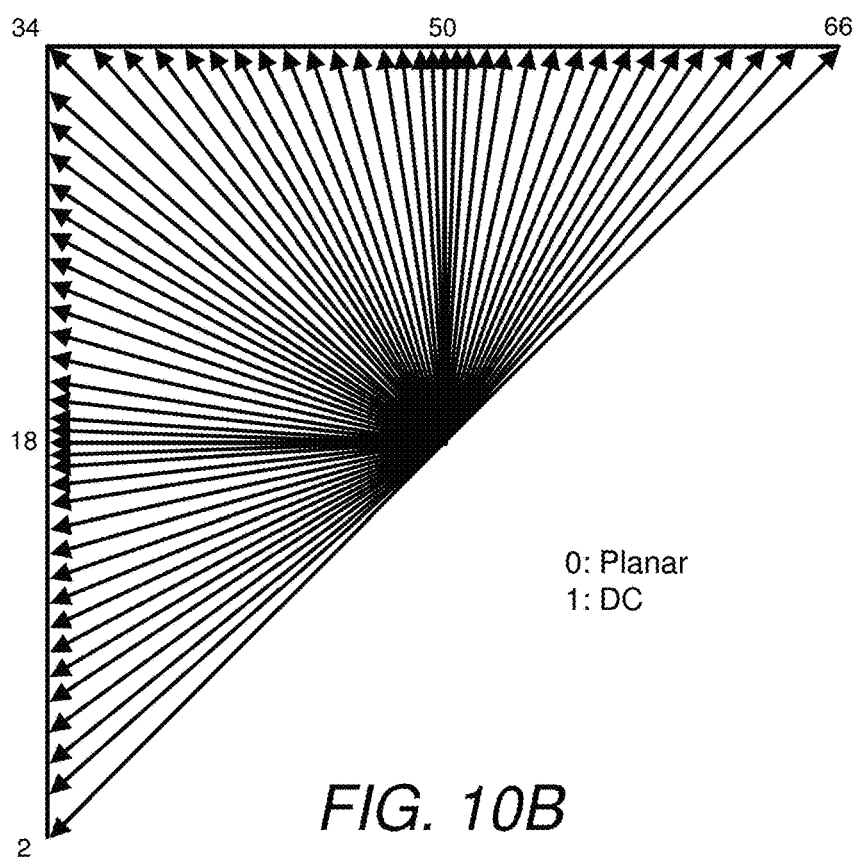

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
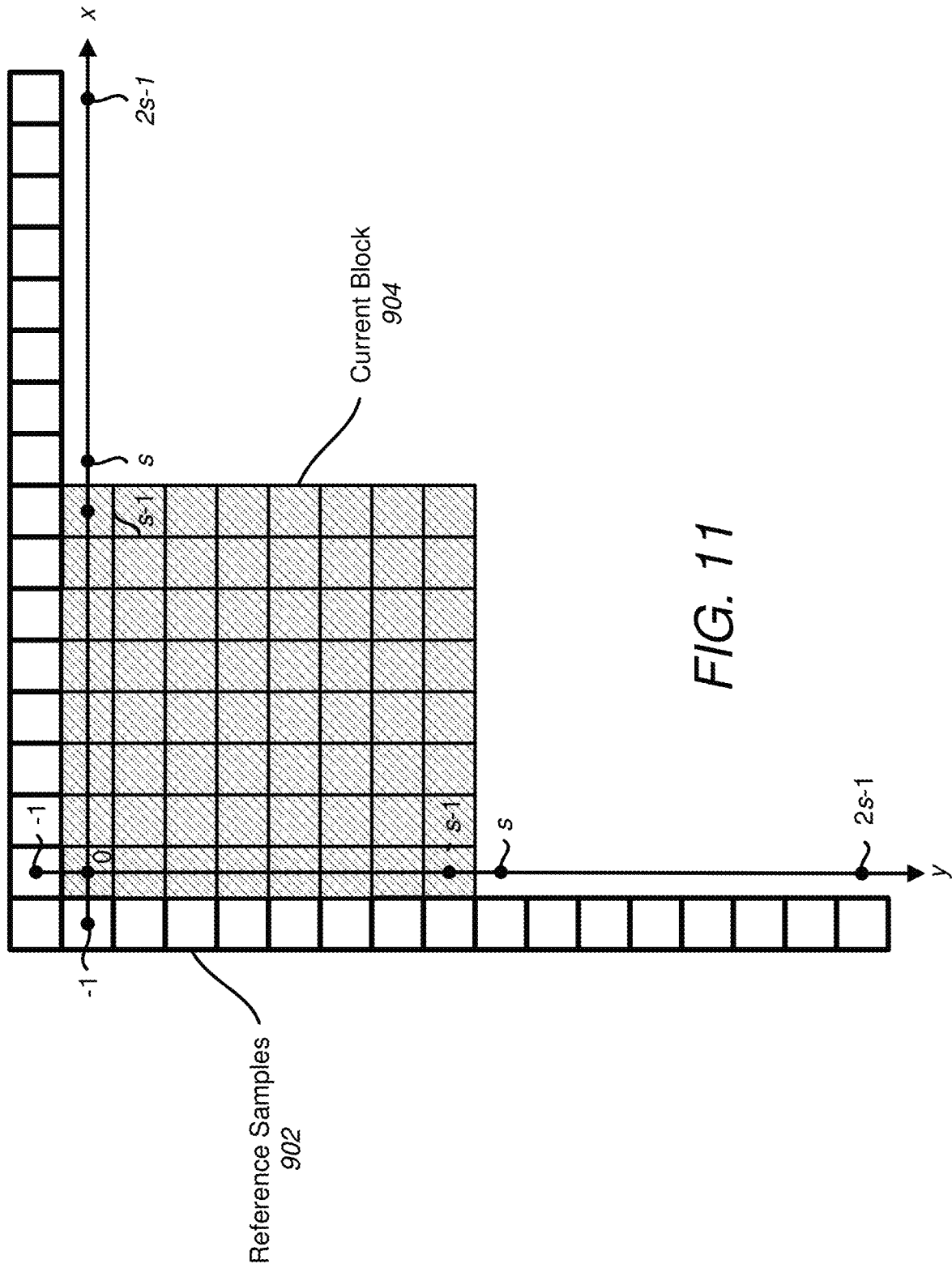
FIG. 11 shows an example of a current block and corresponding reference samples.

FIG. 11 shows a current block 904 and corresponding reference samples 902 from FIG. 9. To further describe how intra prediction modes are applied to determine a prediction (e.g., a prediction block) of current block 904, FIG. 11 shows current block 904 and reference samples 902 in a two-dimensional x, y plane, where a sample may be referenced as p[x][y]. To simplify the prediction process, reference samples 902 may be placed in two, one-dimensional arrays. The reference samples 902, above the current block 904, may be placed in the one-dimensional array $ref_1[x]$:

$$ref_1[x] = p[-1+x][-1], (x \geq 0). \quad (1)$$

The reference samples 902 to the left of current block 904 may be placed in the one-dimensional array $ref_2[y]$:

$$ref_2[y] = p[-1][-1+y], (y \geq 0). \quad (2)$$

The prediction process may comprise determination of a predicted sample p[x][y] (e.g., a predicted value) at a location [x][y] in current block 904. For planar mode, a sample at the location [x][y] in current block 904 may be predicted by determining/calculating the mean of two interpolated values. The first of the two interpolated values may be based on a horizontal linear interpolation at the location [x][y] in current block 904. The second of the two interpolated values may be based on a vertical linear interpolation at location [x][y] in current block 904. The predicted sample p[x][y] in current block 904 may be determined/calculated as:

$$p[x][y] = \frac{1}{2 \cdot s}(h[x][y] + v[x][y] + s), \quad (3)$$

$$\text{where } h[x][y] = (s-x-1) \cdot ref_2[y] + (x+1) \cdot ref_1[s] \quad (4)$$

may be the horizontal linear interpolation at the location [x][y] in current block 904 and $$v[x][y] = (s - y - 1) \cdot ref_1[x] + (y + 1) \cdot ref_2[s] \qquad (5)$$

may be the vertical linear interpolation at the location [x][y] in current block 904. s may be equal to a length of a side (e.g., a number of samples on a side) of the current block 904.

For DC mode, a sample at a location [x][y] in current block 904 may be predicted by the mean of the reference samples 902. The predicted sample p[x][y] in current block 904 may be determined/calculated as:

$$p[x][y] = \frac{1}{2 \cdot s} \left( \sum_{x=0}^{s-1} ref_1[x] + \sum_{y=0}^{s-1} ref_2[y] \right). \qquad (6)$$

For angular modes, a sample at a location [x][y] in current block 904 may be predicted by projecting the location [x][y] in a direction specified by a given angular mode to a point on the horizontal or vertical line of samples comprising reference samples 902. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
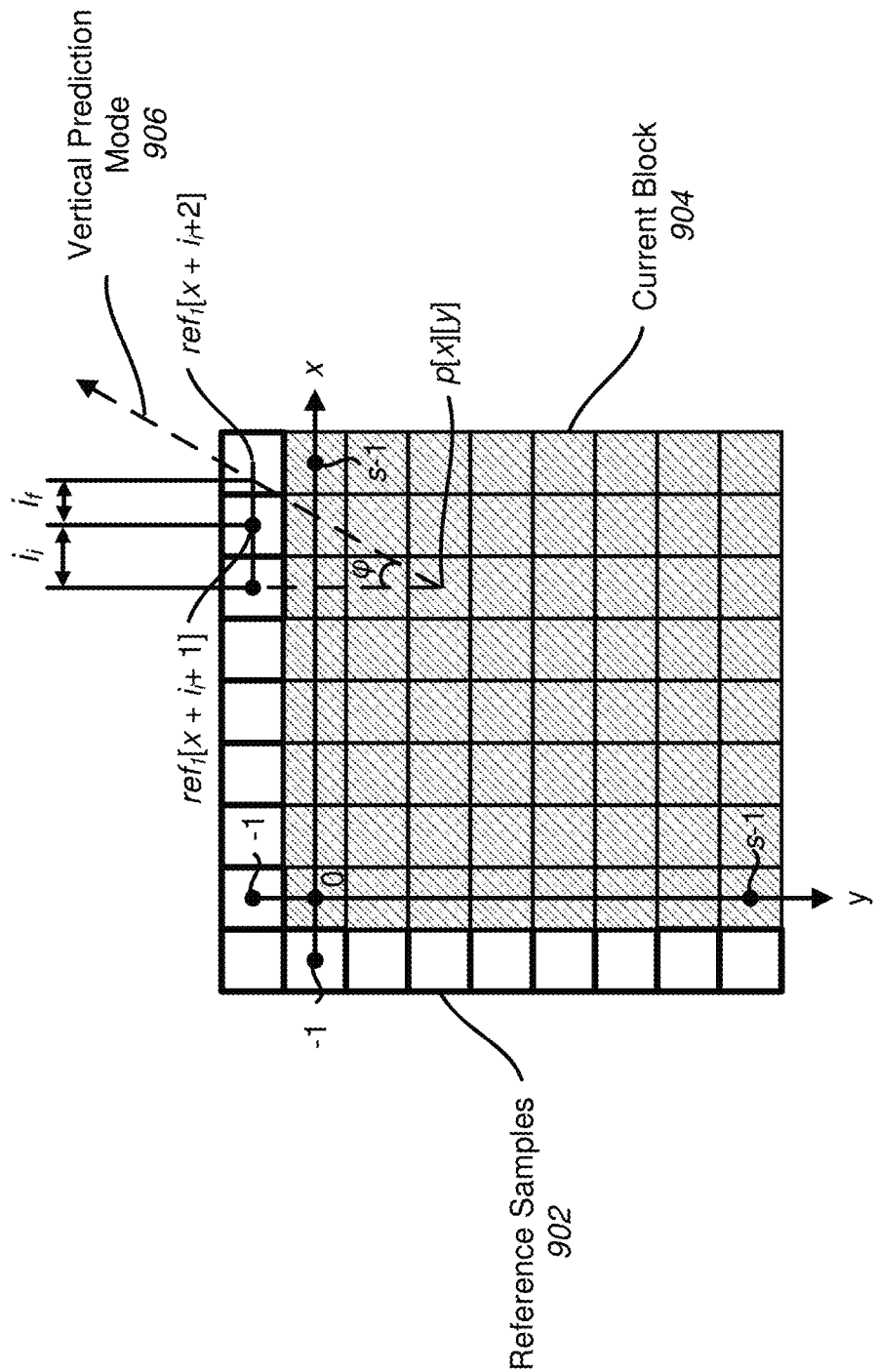
FIG. 12 shows an example of applying an intra prediction mode (e.g., an angular mode) for prediction of a current block.

FIG. 12 shows an example applying an intra prediction mode (e.g., an angular mode such as vertical prediction mode 906) for prediction of a current block 904. FIG. 12 specifically shows prediction of a sample at a location [x][y] in current block 904 for a vertical prediction mode 906. Vertical prediction mode 906 may be given by an angle φ with respect to the vertical axis. The location [x][y] in current block 904, in vertical prediction modes, may be projected to a point (e.g., referred to as a projection point) on the horizontal line of reference samples $ref_1[x]$. The reference samples 902 are only partially shown in FIG. 12 for case of illustration. As shown in FIG. 12, the projection point on the horizontal line of reference samples $ref_1[x]$ may not be exactly on a reference sample. A predicted sample p[x][y] in current block 904 may be determined/calculated by linearly interpolating between the two reference samples, for example, if the projection point falls at a fractional sample position between two reference samples. The predicted sample p[x][y] may be determined/calculated as:

$$p[x][y] = (1 - i_f) \cdot ref_1[x + i_i + 1] + i_f \cdot ref_1[x + i_i + 2]. \qquad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y + 1) \cdot \tan\varphi \rfloor. \qquad (8)$$

$i_f$ may be the fractional part of the horizontal displacement of the projection point relative to the location [x][y] and may be determined/calculated as:

$$i_f = ((y + 1) \cdot \tan\varphi) - \lfloor (y + 1) \cdot \tan\varphi \rfloor, \qquad (9)$$

where $\lfloor \cdot \rfloor$ is the integer floor function.

For horizontal prediction modes, a location [x][y] of a sample in current block 904 may be projected onto the vertical line of reference samples $ref_2[y]$. A predicted sample p[x][y] for horizontal prediction modes may be determined/calculated as:

$$p[x][y] = (1 - i_f) \cdot ref_2[y + i_i + 1] + i_f \cdot ref_2[y + i_i + 2]. \qquad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i = \lfloor (x + 1) \cdot \tan\varphi \rfloor. \qquad (11)$$

$i_f$ may be the fractional part of the vertical displacement of the projection point relative to the location [x][y]. $i_f$ may be determined/calculated as:

$$i_f = ((x + 1) \cdot \tan\varphi) - \lfloor (x + 1) \cdot \tan\varphi \rfloor, \qquad (12)$$

where $\lfloor \cdot \rfloor$ is the integer floor function.

The interpolation functions given by Equations (7) and (10) may be implemented by an encoder and/or a decoder (e.g., encoder 200 in FIG. 2 and/or decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by (1-$i_f$) and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

In some examples, the FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on if (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i] \cdot \text{ref}_1[x + iIdx + i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i] \cdot \text{ref}_2[y + iIdx + i]. \quad (14)$$

Supplementary reference samples may be determined/constructed if the location [x][y] of a sample in current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in ref₂[y] in the vertical line of reference samples 902 to the horizontal line of reference samples 902 using the negative vertical prediction angle φ. Supplementary reference samples may be similarly determined/constructed, for example, if the location [x][y] of a sample in current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in ref₁[x] on the horizontal line of reference samples 902 to the vertical line of reference samples 902 using the negative horizontal prediction angle φ.

An encoder may determine/predict samples of a current block being encoded (e.g., current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. In some examples, the encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. In some examples, a decoder need not receive an indication of an angular intra prediction mode from an encoder for a current block. Instead, the decoder may determine an intra prediction mode through other, decoder-side means.

While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

Similar to intra prediction, an encoder may determine a difference between a current block and a prediction for a current block. An encoder may determine a difference, for example, based on/after determining/generating a prediction for a current block (e.g., using inter prediction). The difference may be a prediction error (e.g., a residual). The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
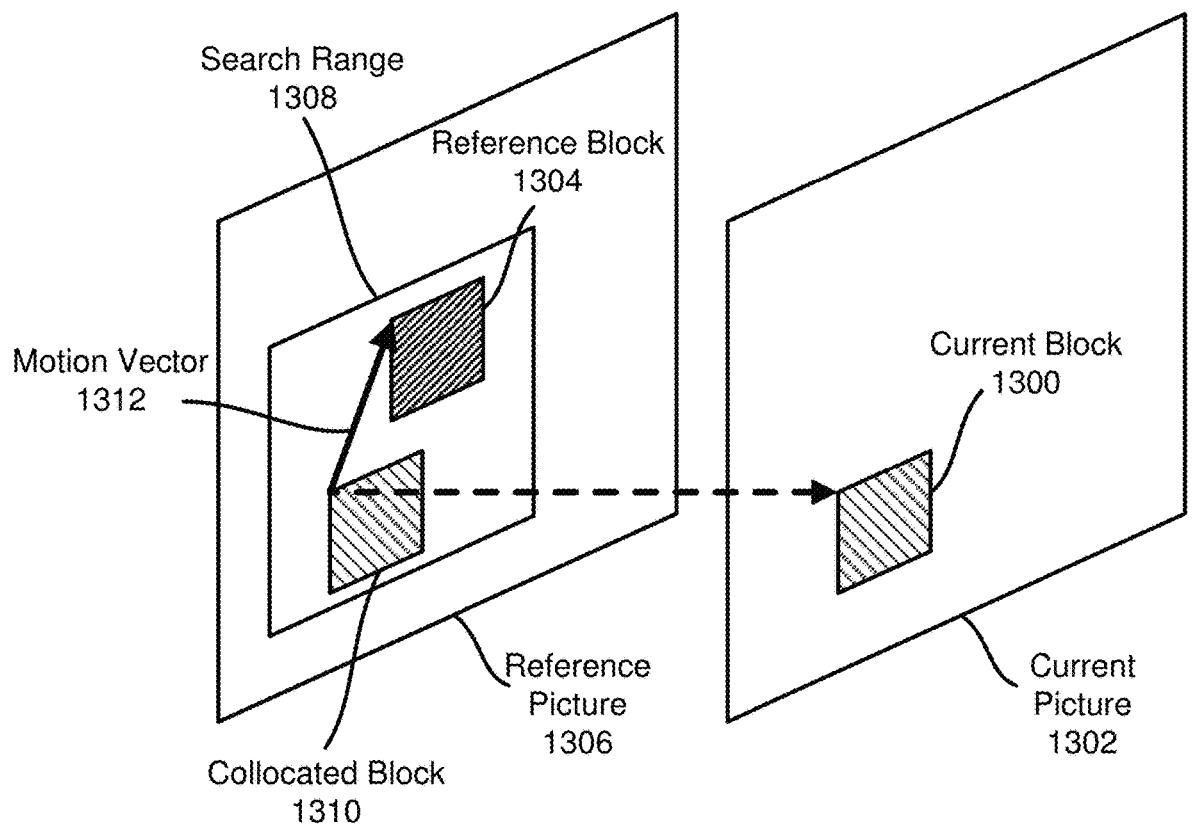
FIG. 13A shows an example of inter prediction performed for a current block in a current picture.

FIG. 13A shows an example of inter prediction. The inter prediction may be performed for a current block 1300 in a current picture 1302 being encoded. An encoder (e.g., encoder 200 as shown in FIG. 2) may perform inter prediction to determine and/or generate a reference block 1304 in a reference picture 1306. Reference block 1304 may be used to predict the current block 1300. Reference pictures (e.g., reference picture 1306) may be prior decoded pictures available at the encoder and/or a decoder. Availability of a prior decoded picture may depend/be based on whether the prior decoded picture is available in a decoded picture buffer, at the time, current block 1300 is being encoded and/or decoded. The encoder may search the one or more reference pictures 1306 for a block (e.g., a candidate reference block) that is similar (or substantially similar) to current block 1300. The encoder may determine the best matching block from the blocks (e.g., candidate reference blocks) tested during the searching process. The best matching block may be a reference block 1304. The encoder may determine that reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of reference block 1304 and original samples of current block 1300.

The encoder may search for reference block 1304 within a reference region (e.g., a search range 1308). The reference region (e.g., a search range 1308) may be positioned around a collocated block (or position) 1310, of current block 1300, in reference picture 1306. Collocated block 1310 may have a same position in the reference picture 1306 as the current block 1300 in the current picture 1302. The reference region (e.g., search range 1308) may at least partially extend outside of reference picture 1306. Constant boundary extension may be used, for example, if the reference region (e.g., search range 1308) extends outside of reference picture 1306. The constant boundary extension may be used such that values of the samples in a row or a column of reference picture 1306, immediately adjacent to a portion of the reference region (e.g., search range 1308) extending outside of reference picture 1306, may be used for sample locations outside of reference picture 1306. A subset of potential positions, or all potential positions, within the reference region (e.g., search range 1308) may be searched for reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of reference block 1304 may be indicated by a reference index pointing into a reference picture list comprising reference picture 1306.

Figure 13B:
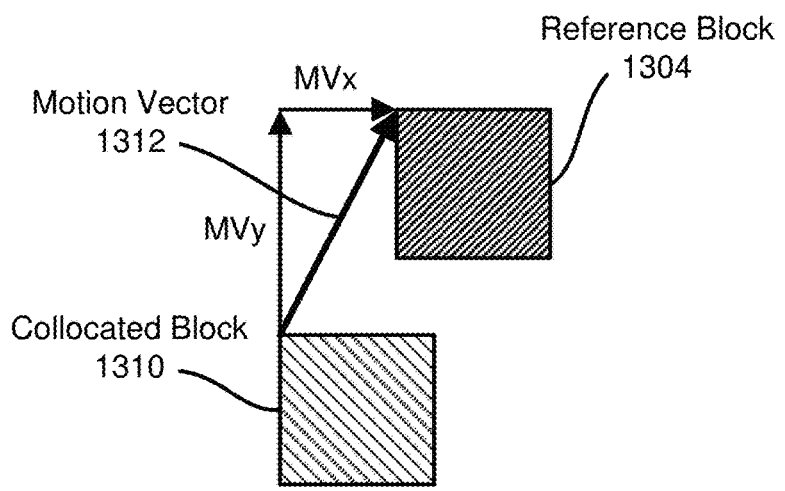
FIG. 13B shows an example motion vector.

FIG. 13B shows an example motion vector. A displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component (MVx) and a vertical component (MVy) relative to the position of current block 1300. A motion vector (e.g., motion vector 1312) may have fractional or integer resolution. A motion vector with fractional resolution may point between two samples in a reference picture to provide a better estimation of the motion of current block 1300. For example, a motion vector may have $\frac{1}{2}$, $\frac{1}{4}$, $\frac{1}{8}$, $\frac{1}{16}$, $\frac{1}{32}$, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between reference block 1304 and current block 1300. The encoder may determine the difference between reference block 1304 and current block 1300, for example, based on/after reference block 1304 is determined and/or generated, using inter prediction, for current block 1300. The difference may be a prediction error (e.g., a residual). The encoder may store and/or send (e.g., signal), in/via a bitstream, the prediction error and/or related motion information. The prediction error and/or the related motion information may be used for decoding (e.g., decoding current block 1300) and/or other forms of consumption. The motion information may comprise the motion vector 1312 and a reference indicator/index. The reference indicator may indicate the reference picture 1306 in a reference picture list. In other examples, the motion information may comprise an indication of motion vector 1312 and/or an indication of the reference indicator/index. The reference indicator may indicate reference picture 1306 in the reference picture list comprising reference picture 1306. A decoder may decode current block 1300 by determining and/or generating the reference block 1304, which may correspond to/form (e.g., be considered as) a prediction of the current block 1300. The decoder may determine and/or generate the reference block 1304, for example, based on the related motion information. The decoder may decode current block 1300 based on combining the prediction (e.g., a reference block) with the prediction error (e.g., a residual block).

Inter prediction, as shown in FIG. 13A, may be performed using one reference picture 1306 as a source of a prediction for current block 1300. Inter prediction based on a prediction of a current block using a single picture may be referred to as uni-prediction.

Inter prediction of a current block, using bi-prediction, may be based on two pictures (e.g., the source of prediction may be from the two pictures). Bi-prediction may be useful, for example, if a video sequence comprises fast motion, camera panning, zooming, and/or scene changes. Bi-prediction also may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
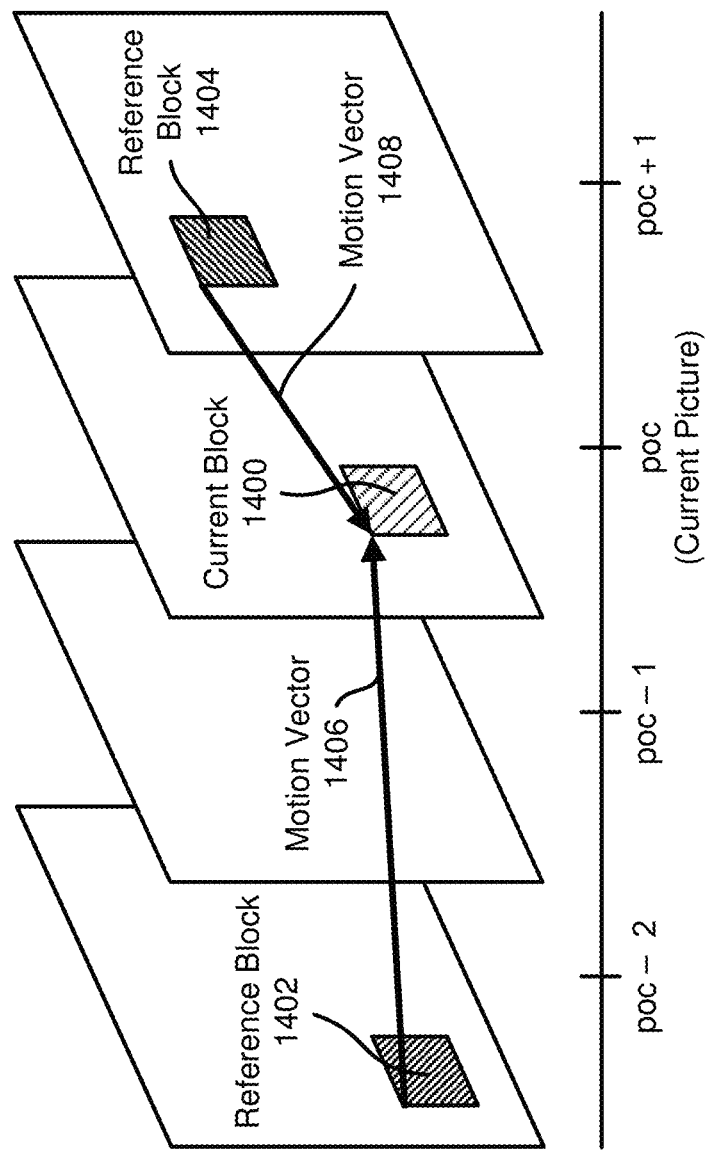
FIG. 14 shows an example of bi-prediction performed for a current block.

FIG. 14 shows an example of bi-prediction. Two reference blocks 1402 and 1404 may be used to predict a current block 1400. Reference block 1402 may be in a reference picture of one of reference picture list 0 or reference picture list 1. Reference block 1404 may be in a reference picture of another one of reference picture list 0 or reference picture list 1. As shown in FIG. 14, reference block 1402 may be in a first picture that precedes (e.g., in time) a current picture of current block 1400, and the reference block 1404 may be in a second picture that succeeds (e.g., in time) the current picture of current block 1400. The first picture may precede the current picture in terms of a picture order count (POC). The second picture may succeed the current picture in terms of the POC. In other examples, the reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between current block 1400 and each of reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption.

The motion information for reference block 1402 may comprise a motion vector 1406 and/or a reference indicator/index. The reference indicator may indicate a reference picture, of the reference block 1402, in a reference picture list. In some examples, the motion information for reference block 1402 may comprise an indication of motion vector 1406 and/or an indication of the reference index. The reference index may indicate the reference picture, of reference block 1402, in the reference picture list.

The motion information for reference block 1404 may comprise a motion vector 1408 and/or a reference index/indicator. The reference indicator may indicate a reference picture, of the reference block 1404, in a reference picture list. The motion information for reference block 1404 may comprise an indication of motion vector 1408 and/or an indication of the reference index. The reference index may indicate the reference picture, of the reference block 1404, in the reference picture list.

A decoder may decode current block 1400 by determining and/or generating the reference blocks 1402 and 1404. The decoder may determine and/or generate the reference blocks 1402 and 1404, for example, based on the respective related motion information for the reference blocks 1402 and 1404. The reference blocks 1402 and 1404 may correspond to/form (e.g., be considered as) the prediction (e.g., used to generate a prediction block) of the current block 1400. The decoder may decode the current block 1400 based on combining the prediction with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques (such as those in HEVC and VVC) may comprise advanced motion vector prediction (AMVP) and/or inter prediction block merging (e.g., merge mode).

An encoder (e.g., encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may reciprocally generate and/or determine the list of candidate MVPs.

The encoder may determine/select an MVP from the list of candidate MVPs. Then, the encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector (e.g., comprising a horizontal component (MVx) and a vertical component (MVy)) that indicates a position relative to a position of the current block being coded, the MVD may be represented by two components $MVD_x$ and $MVD_y$. $MVD_x$ and $MVD_y$ may be determined/calculated as:

$$MVD_x = MV_x - MVP_x, \qquad (15)$$

$$MVD_y = MV_y - MVP_y. \qquad (16)$$

MVDx and MVDy may respectively represent horizontal and vertical components of the MVD. MVPx and MVPy may respectively represent horizontal and vertical components of the MVP.

A decoder (e.g., decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block (e.g., a prediction block). The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
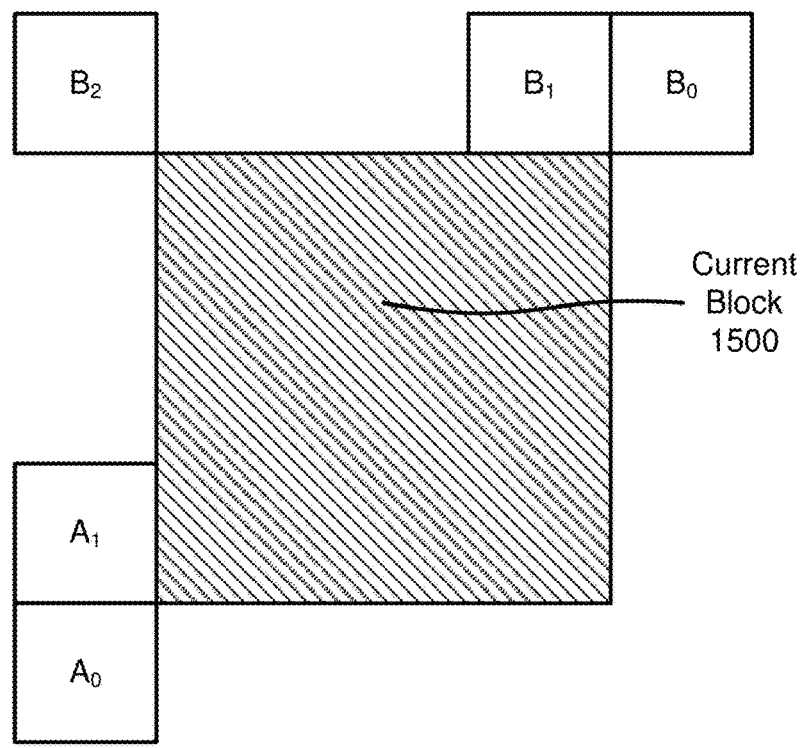
FIG. 15A shows example spatial candidate neighboring blocks relative to a current block being coded.
Figure 15B:
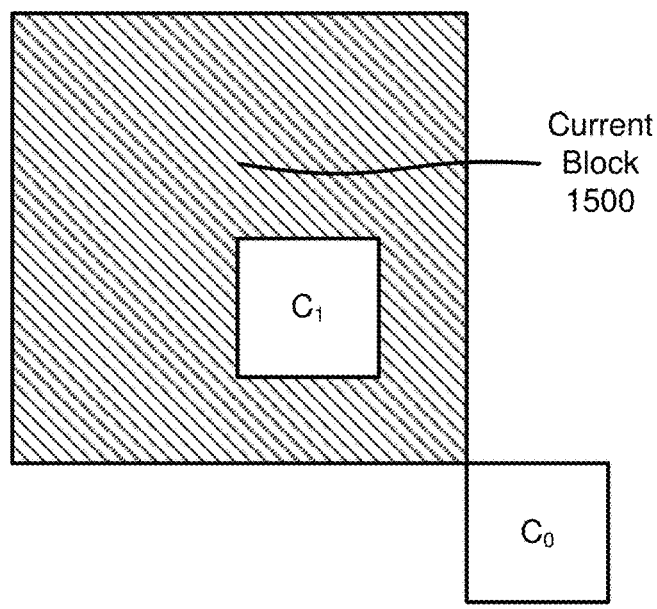
FIG. 15B shows example locations of two temporal, co-located blocks relative to a current block.

FIG. 15A shows example spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to current block 1500 being coded. The two temporal, co-located blocks may be C0 and C1. The two temporal, co-located blocks may be in one or more reference pictures that may be different from the current picture of current block 1500.

An encoder (e.g., encoder 200 as shown in FIG. 2) may code a motion vector using inter prediction block merging (e.g., a merge mode). For example, the encoder (e.g., using merge mode) may reuse the same motion information of a neighboring block (e.g., one of neighboring blocks A0, A1, B0, B1, and B2) for inter prediction of a current block. For example, the encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may reciprocally generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bitstream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. In some examples, the spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

A block matching operation (or technique) may be applied/used (e.g., in inter prediction) to determine a reference block in a different picture than that of a current block being coded (e.g., encoded and/or decoded). A block matching operation also may be applied/used to determine a reference block in a same picture as that of a current block being coded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples (e.g., reconstructed samples) of the current picture. The reference block may comprise decoded blocks of samples of the current picture prior to being processed by in-loop filtering operations (e.g., deblocking and/or SAO filtering).

FIG. 16 shows an example of IBC (e.g., an IBC mode). The example shown in FIG. 16 may correspond to screen content. The rectangular portions/sections with arrows beginning at their boundaries may be the current blocks being encoded. The rectangular portions/sections that the arrows point to may be the reference blocks for predicting the respective current blocks.

A reference block may be determined and/or generated, for a current block, using IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction (e.g., a prediction block) of the current block. The decoder may decode the current block by combining the prediction (e.g., prediction block) with the prediction error (e.g., residual or residual block).

A BV may be predictively coded (e.g., in HEVC, VVC, and/or any other coding standards/formats/protocols) before being stored and/or sent/signaled in/via a bitstream. For example, the BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may reciprocally generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate (e.g., point to) the selected BVP in the list of candidate BVPs. The BVD may be determined/calculated based on a difference between a BV of the current block and the selected BVP. For example, for a BV (e.g., represented by a horizontal component (BVx) and a vertical component (BVy)) that indicates a position relative to a position of the current block being coded, the BVD may be represented by two components $BVD_x$ and $BVD_y$. $BVD_x$ and $BVD_y$ may be determined/calculated as:

$$BVD_x = BV_x - BVP_x, \qquad (17)$$

$$BVD_y = BV_y - BVP_y. \qquad (18)$$

BVDx and BVDy may respectively represent horizontal and vertical components of the BVD. BVPx and BVPy may respectively represent horizontal and vertical components of the BVP. A decoder (e.g., decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction (e.g., a prediction block) of the current block. The decoder may decode the current block by combining the prediction (e.g., the prediction block) with the prediction error (e.g., residual or residual block).

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks of a current block being coded using IBC may be respectively denoted A0, A1, B0, B1, and B2 as shown in FIG. 15A.

As explained above, Intra block coding (IBC) is a prediction method, in which an encoder searches for a best matching block in a search region within a current frame and signals, in a bitstream, block vector (BV) information to the decoder to indicate the searched block. Since the amount of BV data may be significant, the block vector prediction (BVP) may be used to reduce the BV data. Also noted above, a block vector difference (BVD) may be calculated based on the difference between the BV of the current block and the selected BVP. However, the BVD may still be large and may still require a large number of bits to properly encode a specific block. Thus, there is a need to provide a method for encoding, signaling, and decoding image, video image, and video sequence data more efficiently.

Embodiments of the present disclosure are related to an approach for providing a more efficient method for encoding, storing, signaling, and decoding image and video sequence data. These and other features of the present disclosure are described further below.

Figure 17:
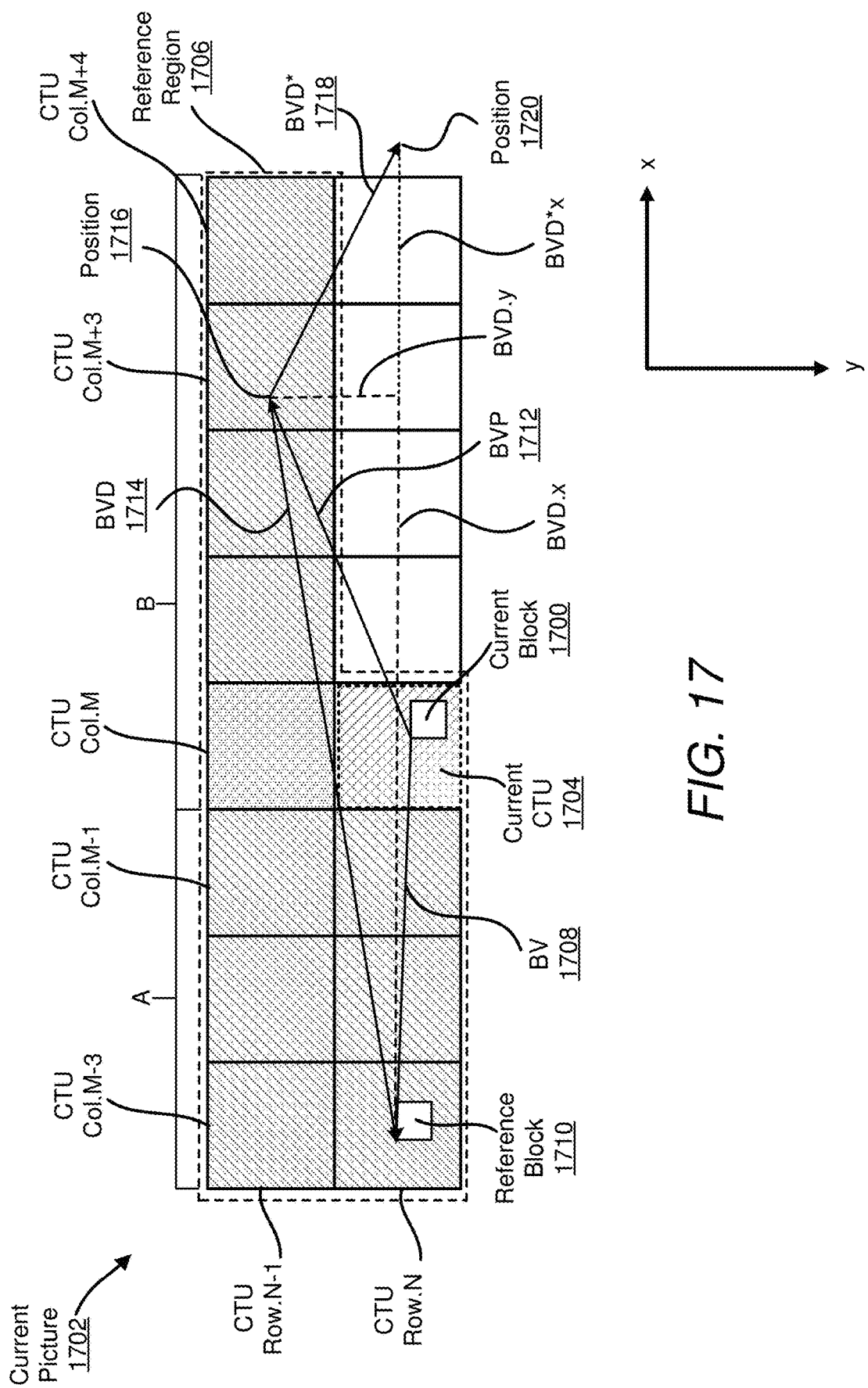
FIG. 17 illustrates an example IBC coding in accordance with embodiments of the present disclosure.

FIG. 17 illustrates an example IBC coding in accordance with embodiments of the present disclosure. In FIG. 17, an encoder, such as encoder 200 in FIG. 2, uses an IBC mode to code a current block 1700 in a current picture (or portion of a current picture) 1702. Current block 1700 may be a coding block (CB) within a coding tree unit (CTU) 1704. IBC searches for a reference block in the same, current picture as the current block. As a result, only part of the current picture may be available for searching for a reference block in IBC. For example, only the part of the current picture that has been decoded prior to the encoding of the current block. This may ensure the encoding and decoding systems can produce identical results but also limits the IBC reference region.

In HEVC, VVC, and other video compression standards, blocks may be scanned from left-to-right, top-to-bottom using a z-scan to form the sequence order for encoding/decoding. Based on the z-scan, CTUs (represented by the large, square tiles in FIG. 17) to the left and above current CTU 1704 may be encoded/decoded prior to current CTU 1704 and current block 1700. Therefore, the samples of these CTUs (shown with textured blocks in FIG. 17) may form an exemplary IBC reference region 1706 for determining a reference block to predict current block 1700 (shown with diagonal crossing lines). In other video encoders and decoders, a different sequence order for encoding/decoding may be used, which may influence IBC reference region 1706 accordingly.

In addition to the encoding/decoding sequence order, one or more additional reference region constraints may be placed on IBC reference region 1706. For example, IBC reference region 1706 may be constrained based on a limited memory for storing reference samples or to CTUs based on a parallel processing approach, like tiles or wavefront parallel processing (WPP). Tiles may be used as part of a picture partitioning process for flexibly subdividing a picture into rectangular and/or irregularly-shaped (i.e., non-rectangular) regions of CTUs such that coding dependencies between CTUs of different tiles are not allowed. WPP may be similarly used as part of a picture partitioning process for partitioning a picture into CTU rows such that dependencies between CTUs of different partitions are not allowed. Each of these tools may enable parallel processing of the picture partitions.

The encoder may apply a block matching technique to determine a block vector (BV) 1708 that indicates a displacement from current block 1700 to a reference block 1710 (or intra block compensated prediction) within IBC reference region 1706 that "best matches" current block 1700. IBC reference region 1706 is a constraint placed on BV 1708. BV 1708 is constrained by IBC reference region 1706 to indicate a displacement from current block 1700 to a reference block that is within IBC reference region 1706. The encoder may determine the best matching reference block from blocks tested, within IBC reference region 1706, during a searching process. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. Reference block 1710 may comprise decoded (or reconstructed) samples of current picture 1702 prior to being processed by in-loop filtering operations, like deblocking or SAO filtering.

The encoder may determine or use a difference (e.g., a corresponding sample-by-sample difference) between current block 1700 and reference block 1710. The difference may be referred to as a prediction error or residual. The encoder may then store and/or signal in a bitstream the prediction error and the related prediction information for decoding.

The prediction information may include BV 1708. In other instances, the prediction information may include an indication of BV 1708. For example, in HEVC, VVC, and other video compression schemes, BV 1708 may be predictively coded before being stored or signaled in a bit stream as explained previously above. BV 1708 for current block 1700 may be predictively coded using a similar technique as AMVP for inter prediction. This technique may be referred to as BV prediction and difference coding. For the BV prediction and difference coding technique, the encoder may code BV 1708 as a difference between BV 1708 and a BV predictor (BVP) 1712. The encoder may select BVP 1712 from a list of candidate BVPs. The candidate BVPs may come from previously decoded BVs of neighboring blocks of current block 1700 or from other sources. In one example, where a BV from a neighboring block of current block 1700 is not available, a null BVP candidate (e.g., with an x-component and y-component with zero magnitude) may be added to the list of candidate BVPs. The encoder may generate or determine the list of candidate BVPs.

After the encoder selects BVP 1712 from the list of candidate BVPs, the encoder may determine a BV difference (BVD) 1714. BVD 1714 may be calculated based on the difference between BV 1708 and BVP 1712. For example, BVD 1714 may be represented by two directional components calculated according to equations (17) and (18) above, which are reproduced below:

$$BVD.x = BV.x - BVP.x \qquad (17)$$

$$BVD.y = BV.y - BVP.y \qquad (18)$$

where BVD.x and BVD.y respectively represent the horizontal and vertical components of BVD 1714, BV.x and BV.y respectively represent the horizontal and vertical components of BV 1708, and BVP.x and BVP.y respectively represent the horizontal and vertical components of BVP 1712. The horizontal x-axis and vertical y-axis are indicated in the lower right-hand corner of current picture 1702 for reference purposes. In the example of FIG. 17, the x-axis increases from left to right, and the y-axis increases from top to bottom.

As can be seen from FIG. 17, BVP 1712 indicates a displacement from a position of current block 1700 to a position (e.g., sample position) 1716. The position of current block 1700 may be determined by the position of the top left sample of current block 1700. Position 1716 may be an integer sample position or a fractional sample position between two integer sample positions.

In an embodiment, the encoder of FIG. 17 may determine a component of BVD 1714. In an embodiment the component of BVD 1714 is a horizontal component (BVD.x) that describes a magnitude or amount of displacement along the x-axis in a positive or negative direction between reference block 1710 and position 1716. In another embodiment, the component of BVD 1714 is a vertical component (BVD.y) that describes a magnitude or amount of displacement along the y-axis in a positive or negative direction between reference block 1710 and position 1716.

As illustrated in FIG. 17, the reference region is divided into two sub-regions. The sub-regions are determined based on the shape and/or characteristics of each sub-region. For example, sub-region A comprises the columns to the left of current block 1700 and is 2 CTUs high, whereas sub-region B comprises the column including current block 1700 and the columns to the right of current block 1700 and is 1 CTU high. The sub-regions may be dynamic. Meaning, as blocks are encoded and as the size and shape of the reference region changes, the size and shape of the sub-regions also change.

In an embodiment, the encoder of FIG. 17 may determine a length of reference region 1706 based on the locations of the RB and BVP. In embodiments where the reference region comprises two rows, like that of FIG. 17, the length of the reference region, for a horizontal component of BVD 1714, may be determined based on the following table:

TABLE 1

| RB Location (row) | BVP Location (sub-region) | Ref. Reg. Length (width or RRw) |
| --- | --- | --- |
| Row. N | A | A |
| Row. N−1 | Any | A + B |

As per Table 1, in an embodiment when the RB is located in CTU Row.N (as shown in FIG. 17) and the position indicated by the BVP is located in reference sub-region A (not shown in FIG. 17), the length of the reference region is the width of sub-region A. Otherwise, the length of the reference region is the width of sub-regions A+B (e.g., the width of the entire picture), as illustrated in FIG. 17. In additional embodiments, the reference region may take on varying shapes and sizes and may comprise additional sub-regions. In most scenarios not specifically addressed in Table 1 and for reference regions comprising two rows, the length (width or RRw) of the reference region is the width of sub-regions A+B.

In embodiments where the reference region comprises two rows, like that of FIG. 17, the length of the reference region, for a vertical component of BVD 1714, may be determined using the following table:

TABLE 2

| RB Location (sub-region) | BVP Location (row) | Ref. Reg. Length (height or RRh) |
| --- | --- | --- |
| B | Row. N−1 | 1 CTU |
| A | Any | 2 CTUs |

When the RB is located in sub-region B and the position indicated by the BVP is located in CTU Row.N−1, the length of the reference region is 1 CTU (i.e., the height of sub-region B). Otherwise, the length of the reference region is the height of sub-region A (i.e., 2 CTUs). As noted above, in additional embodiments, the reference region may take on varying shapes and sizes and may comprise additional sub-regions. In most scenarios not specifically addressed in Table 2 and for reference regions comprising two rows, the length (height or RRh) of the reference region is 2 CTUs.

In embodiments, the encoder of FIG. 17 may determine a magnitude of one or more components of BVD 1714 (e.g., BVD.x and BVD.y). The encoder may also determine whether one or more of the components of BVD 1714 are greater than half of a length of the reference region, as determined in Tables 1 and 2 above. In embodiments where the components of BVD 1714 are greater than half of the length of the reference region, the encoder further determines/finds/calculates compliment BVD* 1718 and its corresponding components (e.g., BVD*.x and BVD*.y).

When the encoder of FIG. 17 determines that the magnitude of the horizontal component (BVD.x) of BVD 1714 is greater than half of a length of the reference region, as determined in Table 1 above, the encoder determines/finds/calculates compliment BVD* 1718 and its corresponding component (BVD*.x). Specifically, the horizontal component (BVD*.x) of BVD* 1718 may be determined/found/calculated using, for example, the following:

$$BVD*.x = -\text{sgn}(x) \cdot (RRw - |BVD.x|) \quad (19)$$

where RRw is the length of the reference region, as per Table 1 above, and sgn(x) is the sign value of BVD.x. Specifically, if BVD.x is a positive value, then sgn(x) is equal to positive one (1). Alternatively, if BVD.y is a negative value, sgn(x) is equal to negative one (−1). In embodiments when the encoder of FIG. 17 determines that the magnitude of the vertical component (BVD.y) of BVD 1714 is greater than half of a length of the reference region, as determined in Table 2 above, the encoder determines/finds/calculates compliment BVD* 1718 and its corresponding vertical component (BVD*.y). Specifically, the vertical component (BVD*.y) of BVD* 1718 may be determined/found/calculated using, for example, the following:

$$BVD*.y = -\text{sgn}(y) \cdot (RRh - |BVD.y|) \quad (20)$$

where RRh is the length of the combination of CTU Row.N+ CTU Row.N−1, as per Table 2 above, and sgn(y) is the sign value of BVD.y. Specifically, if BVD.y is a positive value, then sgn(y) is equal to positive one (1). Alternatively, if BVD.y is a negative value, sgn(y) is equal to negative one (−1).

The encoder may signal, in a bit stream, the prediction error, an indication of a BVP (e.g., via an index pointing into the list of candidate BVPs), and a BVD (e.g., one or more of the separate components of the received BVD given by equations (17)-(20)). In an embodiment, when the magnitude of a component of the BVD is greater than half of a length (e.g., width) of the reference region, the signal sent by the encoder may comprise BVD*.x. In such embodiments, the encoder signals the BVD*.x value instead of BVD.x because doing so is more efficient and requires fewer bits.

Alternatively, the encoder may signal, in a bit stream, the prediction error, an indication of a BVP (e.g., via an index pointing into the list of candidate BVPs), and a BVD (e.g., one or more of the separate components of the received BVD given by equations (17)-(20)). In an embodiment, when the magnitude of the component of the BVD is greater than half of a length (e.g., height) of the reference region, the signal sent by the encoder may comprise BVD*.y. In such embodiments, the encoder signals the BVD*.y value instead of BVD.y because doing so is more efficient and requires fewer bits.

In embodiments, when the magnitude of a horizontal component of the received BVD is greater than half of a length (e.g., width) of the reference region and a vertical component of the received BVD is greater than half of a length (e.g., height) of the reference region. In such embodiments, the encoder may determine to signal one or both of BVD*.x and BVD*.y. In additional embodiments, the encoder may determine which of the components (i.e., BVD*.x or BVD*.y) provides a larger bit savings. That is, when the difference between BVD.x and BVD*x is larger than the difference between BVD.y and BVD*y, the encoder may determine to send BVD*.x and not BVD*.y.

A decoder, such as decoder 300 in FIG. 3, may receive, in a bit stream, the prediction error, an indication of a BVP (e.g., via an index pointing into the list of candidate BVPs), and a BVD (e.g., one or more of the components given by equations (17)-(20)).

The decoder may determine a second BVD based on the received BVD and by determining whether a location displaced from the current block (e.g., the sum of the received BVP and the received BVD), is outside the reference region.

When the location displaced from the current block is located inside the reference region, no additional calculations are necessary. In this embodiment, the second BVD is assigned the same value as the received BVD.

When the location displaced from the current block is located outside the reference region, depicted as position 1720 in FIG. 17, the decoder may assume that a compliment BVD* was used to encode the BVD. For example, the location displaced from the current block is located on either the right or left side of the reference region, the decoder will determine that one of the received BVD component value is a horizontal compliment component, BVD*.x. Additionally, or alternatively, if the location displaced from the current block is located above or below the reference region, the decoder will determine that one of the received BVD component values is a vertical compliment component, BVD*.y Using one or more of equations (19)-(20), the decoder may determine, calculate, or find the magnitude of at least one of the BVD* components (BVD*.x or BVD*.y). However, rather than finding for the BVD* components as described above, the decoder finds for the absolute value of the horizontal or vertical BVD component (BVD.x and/or BVD.y) by finding the difference between the length of the reference region and the respective BVD* component and assigning a positive or negative sign opposite to that of the BVD* component. This calculated value is the second BVD.

The decoder may further calculate the BV, for determining a reference block to predict the CB, based on the sum of the second BVD and the BVP.

Figure 18A:
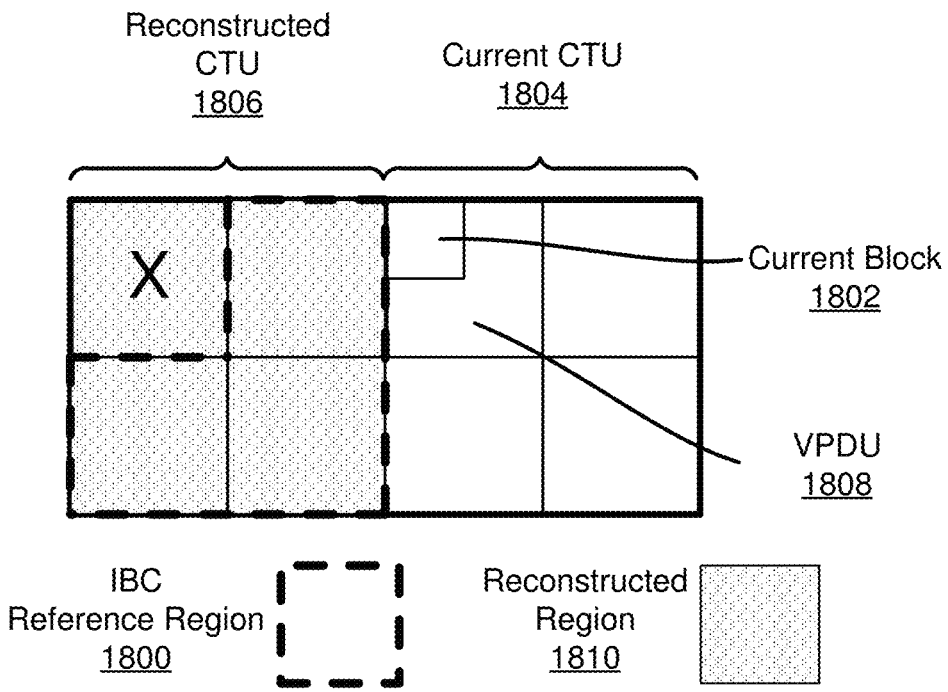
FIG. 18A illustrates an example IBC reference region determined based on an IBC reference sample memory size of 128×128 samples and a CTU size of 128×128 samples in accordance with embodiments of the present disclosure.

FIG. 18A illustrates a current block 1802 within a current CTU 1804. Current block 1802 is the first block coded in current CTU 1804 and is coded using IBC mode. As described above with respect to FIG. 17, a block is coded using IBC mode by determining a "best matching" reference block within an IBC reference region. In FIG. 18A, IBC reference region 1800 is be constrained to: a reconstructed part of current CTU 1804; and the single, reconstructed CTU 1806 to the left of current CTU 1804 not including a portion, of reconstructed CTU 1806, collocated with either the reconstructed part of current CTU 1804 or a virtual pipeline data unit (VPDU) 1808 in which current block 1802 is located. In the example of FIG. 18A, CTUs are divided into 4 VPDUs of size 64×64 samples. Accordingly, IBC reference region 1800 for current block 1802 includes reconstructed region 1810 (shown with textured blocks) except the 64×64 region of reconstructed CTU 1806 collocated with VPDU 1808. This collocated region is marked with an "X" in FIG. 18A. It should be noted that, for different size CTUs, the IBC reference region in FIG. 18A may include a different number of CTUs to the left of current CTU 1804 than the single, reconstructed CTU 1806. For example, for CTU sizes of 64×64, the IBC reference region may include 4 CTUs to the left of current CTU 1804 based on the number of reconstructed reference samples the IBC reference sample memory may store divided by the size of the CTUs in the current picture.

Figure 18B:
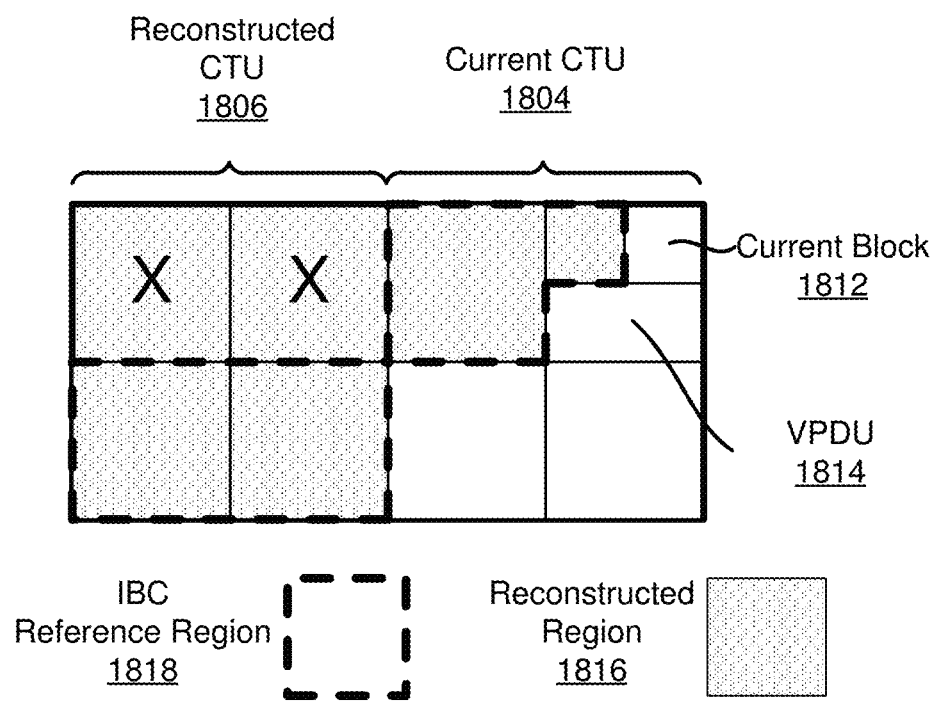
FIG. 18B illustrates another example IBC reference region determined based on an IBC reference sample memory size of 128×128 samples and a CTU size of 128×128 samples in accordance with embodiments of the present disclosure.

FIG. 18B continues with the example of FIG. 18A for a later coded block in current CTU 1804 in accordance with embodiments of the present disclosure. The later coded block is labeled as current block 1812 in FIG. 18B and is coded using IBC mode, as described above with respect to FIG. 17, by determining a "best matching" reference block within an IBC reference region. IBC reference region 1818 for current block 1812 may be constrained to: a reconstructed part of current CTU 1804; and the reconstructed CTU 1806 not including a portion, of reconstructed CTU 1806, collocated with either the reconstructed part of current CTU 1804 or a virtual pipeline data unit (VPDU) 1814 in which current block 1812 is located. As mentioned above with respect to FIG. 18A, current CTU 1804 is divided into 4 VPDUs of size 64×64 samples. Accordingly, IBC reference region 1818 in FIG. 18B for current block 1812 includes reconstructed region 1816 (shown with textured blocks) except the part of CTU 1806 collocated with either the reconstructed part of current CTU 1804 or VPDU 1814. These collocated regions are each marked with an "X" in FIG. 18B. As illustrated in FIGS. 17-23, the reference region, as disclosed herein, may take on many shapes and sizes.

Figure 19:
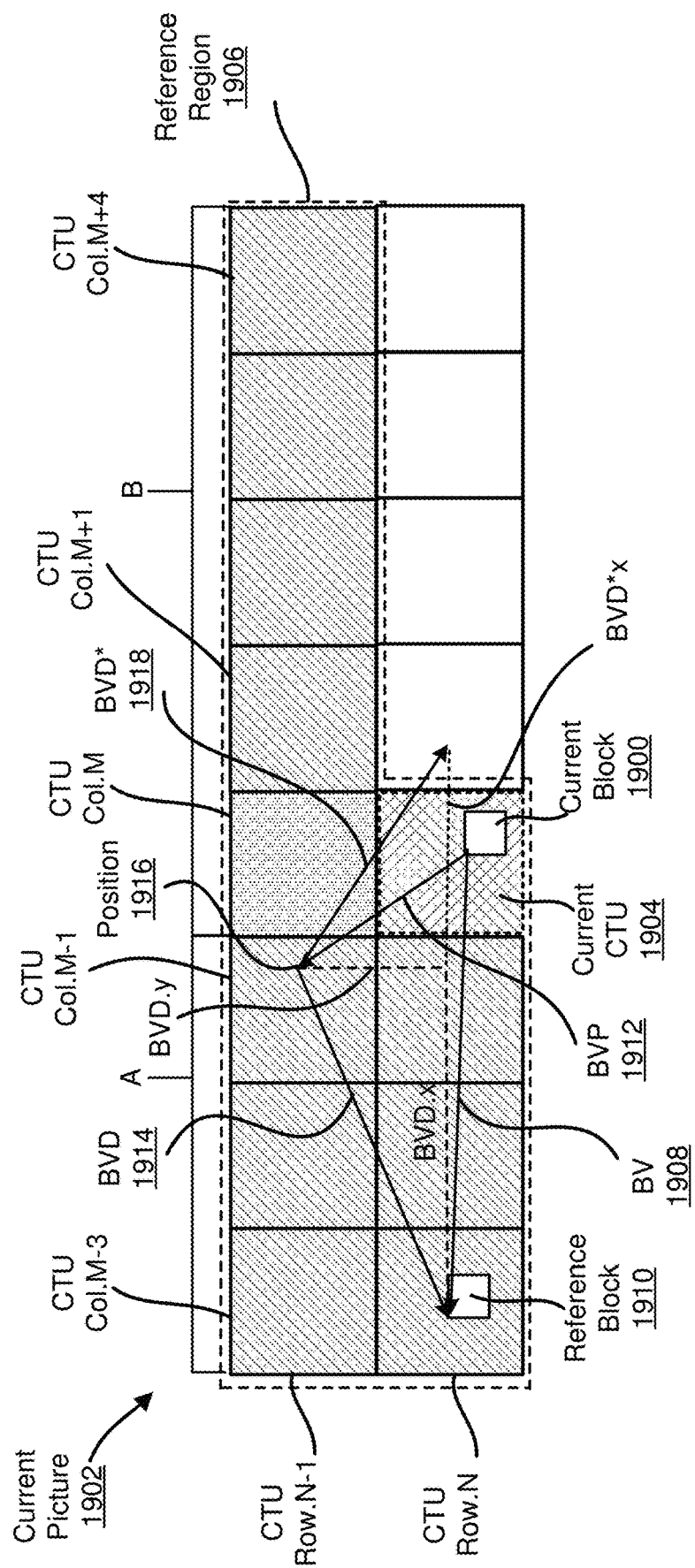
FIGS. 19-23 illustrate example IBC coding in accordance with embodiments of the present disclosure.

FIG. 19 illustrates an example IBC coding in accordance with embodiments of the present disclosure. In FIG. 19, like in FIG. 17, an encoder, such as encoder 200 in FIG. 2, uses an IBC mode to code a current block 1900 in a current picture (or portion of a current picture) 1902. Current block 1900 may be a coding block (CB) within a coding tree unit (CTU) 1904. IBC searches for a reference block in the same, current picture as the current block. FIG. 19 illustrates replacing: BVP 1712 with another BVP 1912 and BVD 1714 with another BVD 1914, that were calculated or determined in the manner discussed above with respect to FIG. 17. Because the embodiment illustrated in FIG. 19 has a replaced BVP 1912 and BVD 1914, the horizontal component (BVD.x) magnitude/length/amount and vertical component (BVD.y) magnitude/length/amount are also changed and must be calculated/determined. BV 1708 and BV 1908 are unchanged.

FIG. 19 further illustrates a reference region 1906 having two sub-regions (A and B). The length of reference region 1906 may be determined using the methods described above and in accordance with Tables 1 and 2.

As explained above with respect to FIG. 17, when the encoder of FIG. 19 determines that the magnitude of the component (BVD.x) of BVD 1914 is greater than half of a length of the sub-region (A), the encoder determines, finds, or calculates compliment BVD* 1918 and at least one corresponding component (BVD*.x) using equation (19), which is reproduced below:

$$BVD*.x = -\text{sgn}(x) \cdot (RRw - |BVD.x|) \quad (19)$$

A decoder, such as decoder 300 in FIG. 3 may follow the same or similar steps described above with respect to FIG. 17 to calculate BV 1908, for determining a reference block to predict the CB, based on the sum of the second BVD and the BVP.

Figure 20:
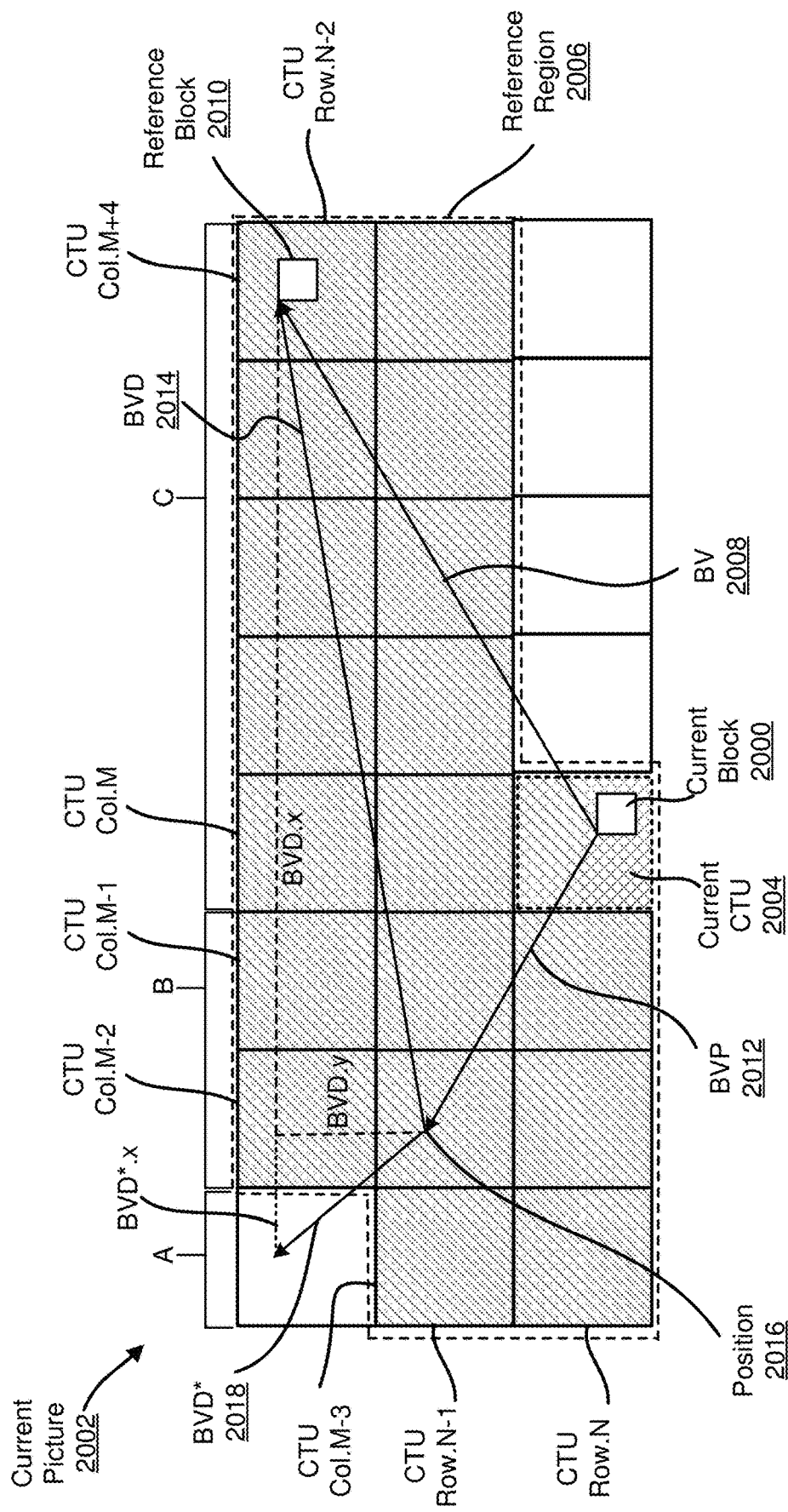

FIG. 20 illustrates an example IBC coding in accordance with embodiments of the present disclosure. In FIG. 20, like in FIGS. 17 and 19, an encoder, such as encoder 200 in FIG. 2, uses an IBC mode to code a current block 2000 in a current picture (or portion of a current picture) 2002. Current block 2000 may be a coding block (CB) within a coding tree unit (CTU) 2004. IBC searches for a reference block in the same, current picture as the current block. FIG. 20 illustrates and determines, finds, or calculates many similar features as FIG. 17, including BV 2008, BVP 2012, and BVD 2014, each determined, found, or calculated as described for FIG. 17 above.

The encoder of FIG. 20 may similarly determine a component (BVD.x and/or BVD.y) of BVD 2014. In an embodiment, and as described above, the component of BVD 2014 is a horizontal component (BVD.x) that describes a magnitude or amount of displacement along the x-axis between reference block 2010 and position 2016. In another embodiment, and as described above, the component of BVD 2014 is a vertical component (BVD.y) that describes a magnitude of displacement along the y-axis between reference block 2010 and position 2016.

FIG. 20 further illustrates a reference region 2006 having three sub-regions (A, B, and C). Sub-region (A) includes column CTU Col.M−3, sub-region (B) includes columns CTU Col.M−2 through Col.M−1, and sub-region (C) comprises columns CTU Col.M through CTU Col.M+4. Reference region 2006 also comprises three rows—CTU Row.N through CTU Row.N−2. The sub-regions may be dynamic. Meaning, as blocks are encoded and as the size and shape of the reference region changes, the size and shape of the sub-regions also changes.

In an embodiment, the encoder of FIG. 20 may determine whether position 2016 is located within a sub-region of the reference region 2006. The encoder of FIG. 20 may also determine or find the row where position 2016 is located. In the same or additional embodiments, the encoder of FIG. 20 may also determine whether the magnitude of the component (BVD.x and/or BVD.y) of BVD 2014 is greater than half of a length of the reference region, as described above with respect to FIGS. 17 and 19.

For example, the encoder of FIG. 20 may determine whether the magnitude of the horizontal component of BVD 2014 is greater than a length of reference region 2006. The length of the reference region may be determined using the following table:

TABLE 3

| RB Location (row) | BVP Location (sub-region) | Ref. Reg. Length (width or RRw) |
|---|---|---|
| Row. N−2 | B or C | B + C |
| Row. N−1 | Any | A + B + C |
| Row. N | A or B | A + B |

When the RB is located in CTU Row.N−2 (i.e., depicted as the top row in FIG. 20) and the position indicated by the BVP is located in reference sub-region B or C, the length of the reference region is the width of sub-regions B+C (i.e., the width of Row.N−2). When the RB is located in CTU Row.N−1 (i.e., depicted as the middle row in FIG. 20) the length of the reference region is the width of sub-regions A+B+C (i.e., the width of CTU Row.N−1 or the width of the reference region). And when the RB is located in CTU Row.N (i.e., depicted as the bottom row of FIG. 20) and the position indicated by the BVP is located in reference sub-region A or B, the length of the reference region is the width of sub-regions A+B (i.e., the width of CTU Row.N). In most scenarios not specifically addressed in Table 3 and for reference regions having three rows, the length of the reference region is the width of sub-regions A+B+C (i.e., the full width of the reference region).

Similarly, in embodiments where the reference region comprises three rows, like that of FIG. 20, the length of the reference region, for a vertical component of BVD 2014, may be determined using the following table:

TABLE 4

| RB Location (sub-region) | BVP Location (row) | Ref. Reg. Length (height or RRh) |
|---|---|---|
| A | Row. N−2 or Row. N−1 | 2 CTU |
| B | Any | 3 CTUs |
| C | Row. N or Row. N−1 | 2 CTUs |

When the RB is located in sub-region A and the position indicated by the BVP is located in CTU Row.N−2 or CTU Row.N−1, the length of the reference region is 2 CTUs (i.e., the height of sub-region A). When the RB is located in sub-region B, the length of the reference region is 3 CTUs (i.e., the height of sub-region B). And when the RB is located in sub-region C and the position indicated by the BVP is located in CTU Row.N or CTU Row.N−1, the length of the reference region is 2 CTUs (i.e., the height of sub-region C). In most scenarios not specifically addressed in Table 4, the length of the reference region is the height of sub-region B. As noted above, in additional embodiments, the reference region may take on varying shapes and sizes.

When the encoder of FIG. 20 determines that the magnitude of the component (BVD.x) of BVD 2014 is greater than half of a length of sub-regions B+C, the encoder determines/or calculates compliment BVD* 2018 and its corresponding component (BVD*.x and/or BVD*.y)—using the methods described above related to FIGS. 17 and 19. Specifically, the component (BVD*.x) of BVD* 2018 may be determined or calculated according to equations (19)-(20) above, where RRw is the length (e.g., width) of the sum/combination of sub-regions (B+C), which also corresponds to the length (e.g., width) of CTU Row.N−2, as per Table 3 above.

A decoder, such as decoder 300 in FIG. 3 may follow the same or similar steps described above with respect to FIGS. 17 and 19 to calculate BV 2008, for determining a reference block to predict the CB, based on the sum of the second BVD and the BVP using the values of FIG. 20.

Figure 21:
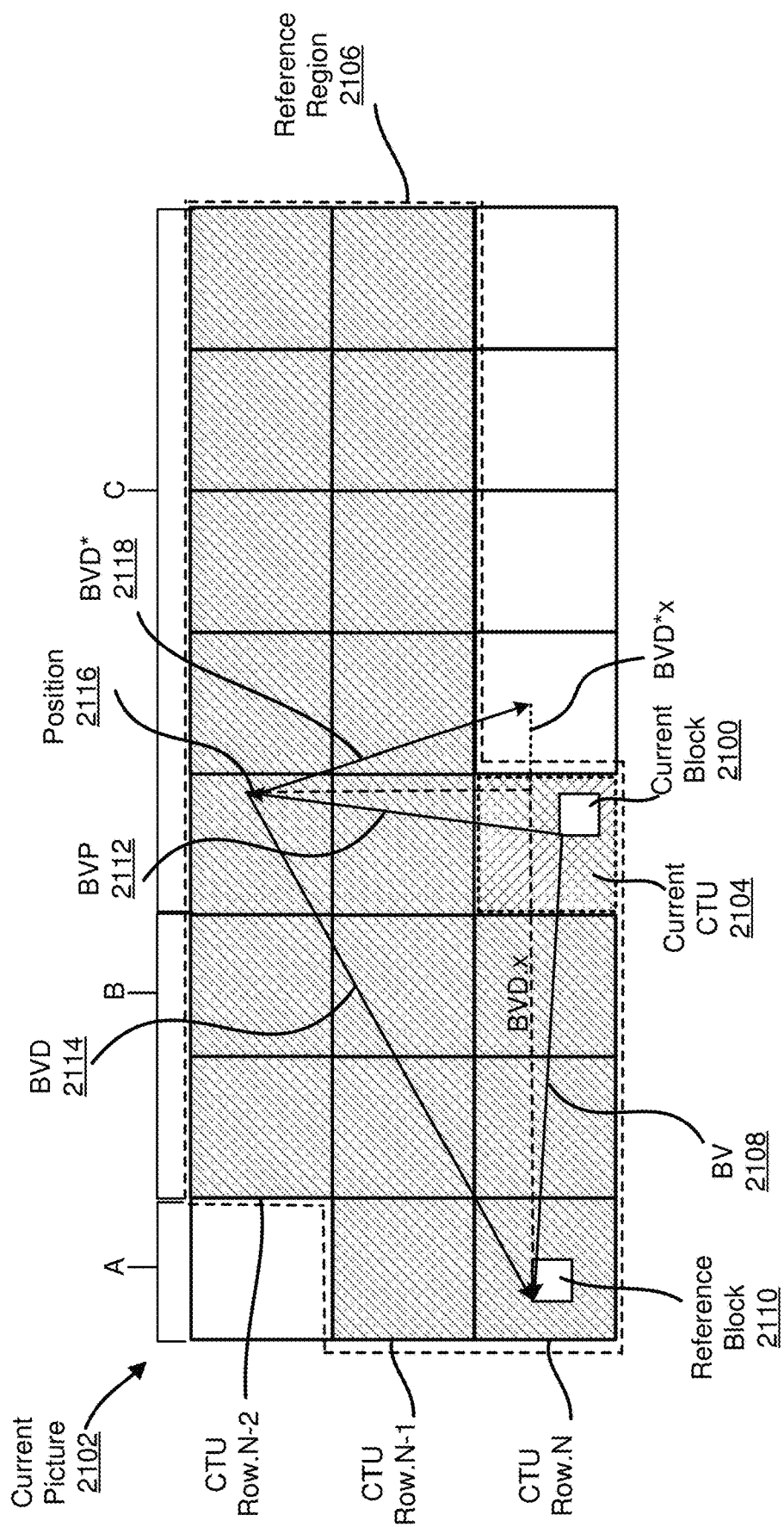

FIG. 21 illustrates an example IBC coding in accordance with embodiments of the present disclosure. In FIG. 21, like FIGS. 17, 19, and 20, an encoder, such as encoder 200 in FIG. 2, uses an IBC mode to code a current block 2100 in a current picture (or portion of a current picture) 2102. FIG. 21 illustrates and determines/finds/calculates many similar features as FIGS. 17, 19, and 20, including BV 2108, BVP 2112, and BVD 2114, each determined/found/calculated as described for FIGS. 17, 19, and 20 above.

The encoder of FIG. 21 may similarly determine a component (BVD.x) of BVD 2114, that describes an amount of displacement/distance along the x-axis between reference block 2110 and position 2116, and a vertical component (BVD.y) that describes a magnitude or amount of displacement along the y-axis between reference block 2110 and position 2116.

Like FIG. 20, FIG. 21 illustrates a reference region 2106 having three sub-regions (A, B, and C) and comprises three rows. As described above with respect to FIGS. 17, 19, and 20, when the encoder of FIG. 21 determines that the magnitude of the component (BVD.x) of BVD 2114 is greater than half of a length of the sum/combination of sub-regions (A and B), the encoder determines/finds/calculates compliment BVD* 2118 its corresponding component (BVD*.x and/or BVD*.y)—using the methods described above. Specifically, the component (BVD*.x) of BVD* 2118 may be determined or calculated according to equations (19)-20 above, where RRw is the length (e.g., width) of the sum/combination of sub-regions (A+B), which also corresponds to the length (e.g., width) of CTU Row.N, as per Table 3 above.

A decoder, such as decoder 300 in FIG. 3 may follow the same or similar steps described above with respect to FIGS. 17, 19, and 20 to calculate BV 2108, for determining a reference block to predict the CB, based on the sum of the second BVD and the BVP using the values of FIG. 21.

Figure 22:
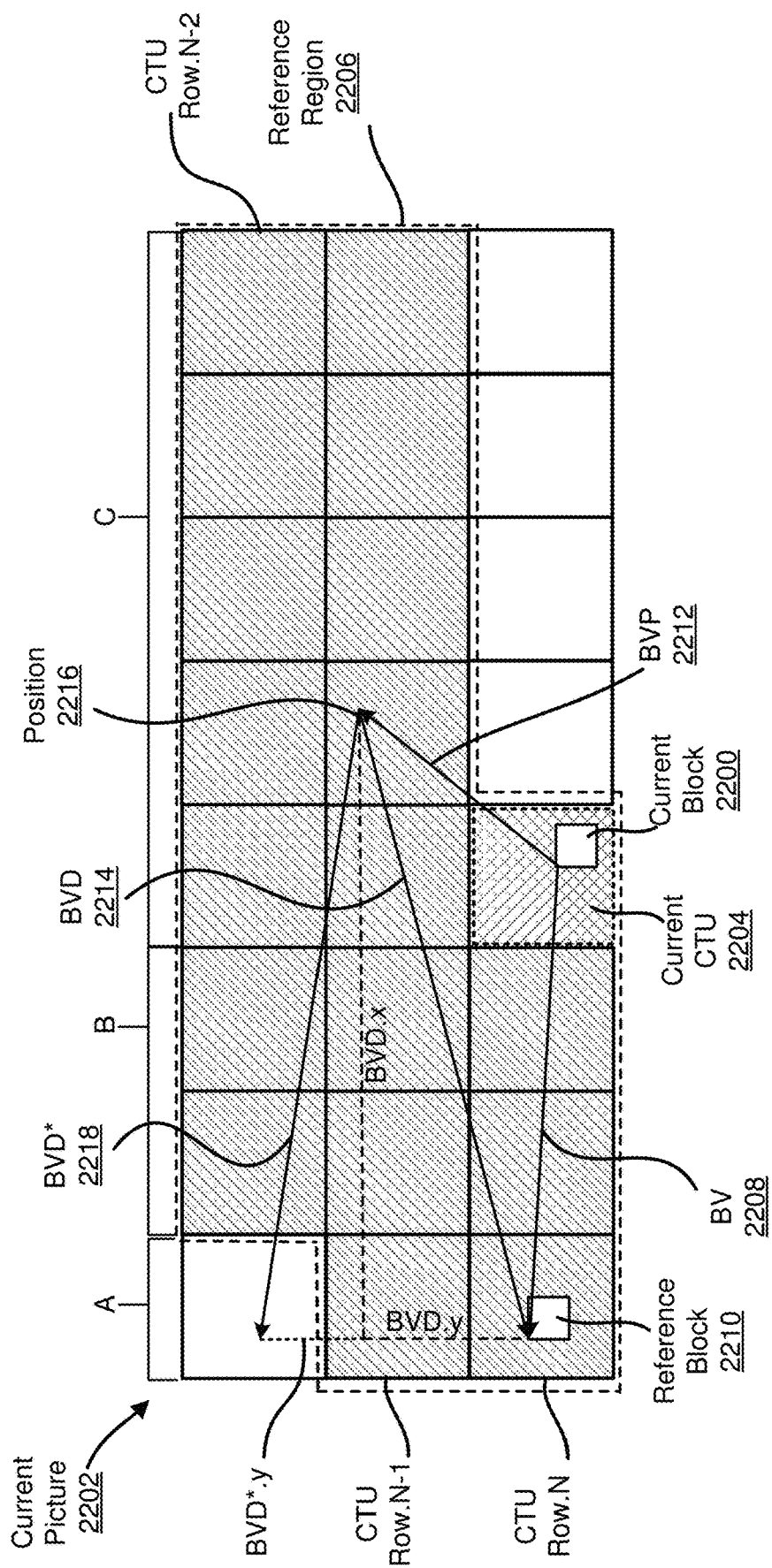

FIG. 22 illustrates an example IBC coding in accordance with embodiments of the present disclosure. Like FIGS. 20-21, FIG. 22 illustrates a reference region 2206 having three sub-regions (A, B, and C) and comprises three rows. As described above with respect to FIGS. 17 and 19-21, when the encoder of FIG. 22 determines that the magnitude of the component (BVD.y) of BVD 2214 is greater than half of a length of the reference region, the encoder determines, finds, or calculates compliment BVD* 2218 its corresponding component (BVD*.y) according to equation (20), reproduced below:

$$BVD*.y = -\text{sgn}(y) \cdot (RRh - |BVD.y|) \quad (20)$$

where RRh is the length of the combination of CTU Row.N+ CTU Row.N−1, as per Table 4 above and sgn(y) is the sign value of BVD.y, as described above.

The encoder may signal, in a bit stream, the prediction error, an indication of a BVP (e.g., via an index pointing into the list of candidate BVPs), and a BVD (e.g., the separate components of the received BVD given by at least one of equations (17)-(20)). In an embodiment, when the magnitude of the component of the received BVD is greater than half of a length (e.g., height) of the reference region, the signal sent by the encoder may comprise a BVD*.y component.

A decoder, such as decoder 300 in FIG. 3 may follow the same or similar steps described above with respect to FIGS. 17 and 19-21 to calculate BV 2208, for determining a reference block to predict the CB, based on the sum of the second BVD and the BVP using the values of FIG. 22.

Figure 23:
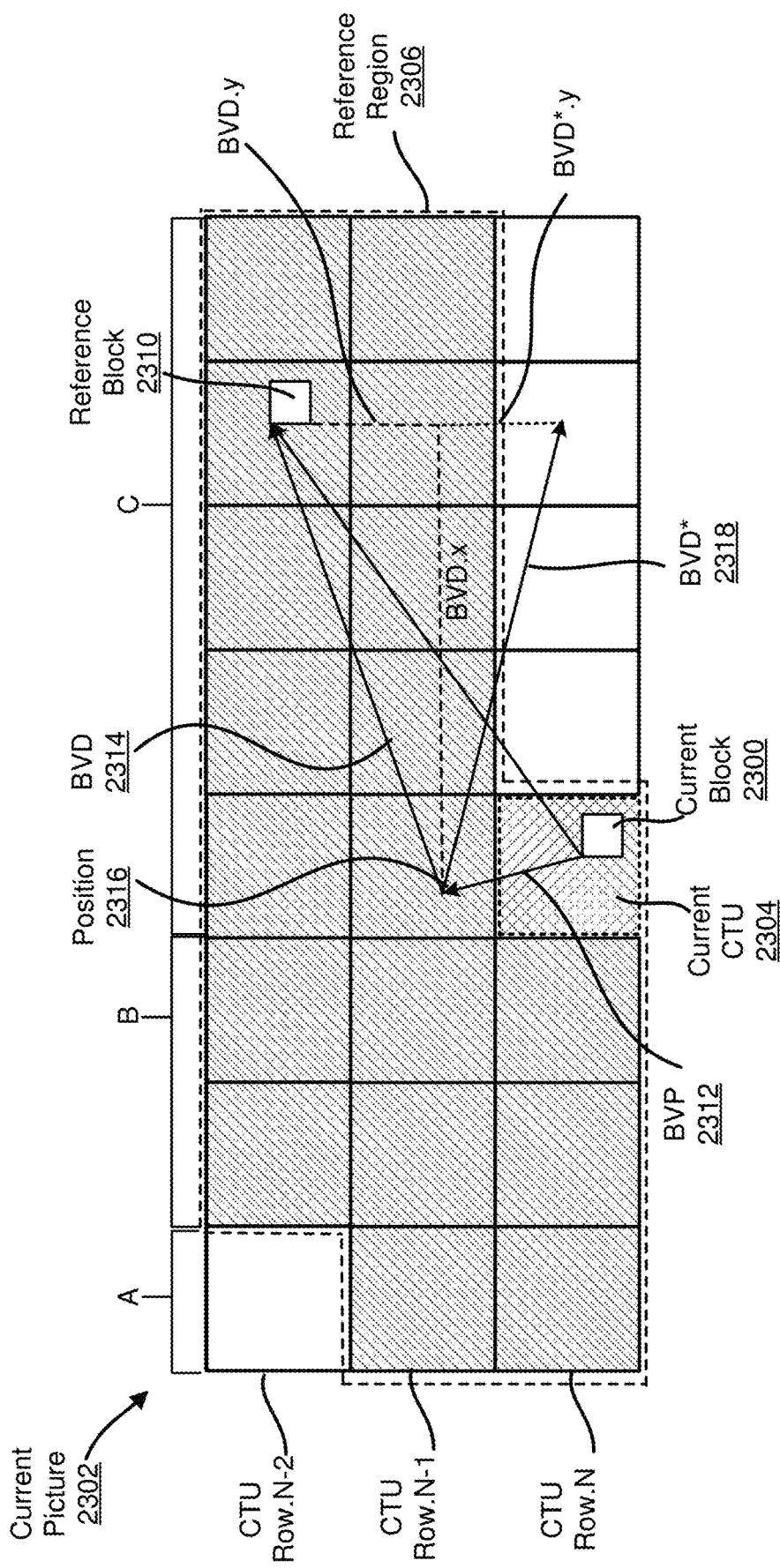

FIG. 23 illustrates an example IBC coding in accordance with embodiments of the present disclosure. Like FIGS. 20-22, FIG. 23 illustrates a reference region 2306 having three sub-regions (A, B, and C) and comprises three rows. As described with respect to FIGS. 17 and 19-22, when the encoder of FIG. 23 determines that the magnitude of the component (BVD.y) of BVD 2214 is greater than half of a length of the reference region, as per table 4, the encoder determines, finds, or calculates compliment BVD* 2218 its corresponding component (BVD*.y) according to equation (20).

A decoder, such as decoder 300 in FIG. 3 may follow the same or similar steps described above with respect to FIGS. 17 and 19-22 to calculate BV 2308, for determining a reference block to predict the CB, based on the sum of the second BVD and the BVP using the values of FIG. 23.

While each of the embodiments described above are related to intra prediction methods, a person of ordinary skill would understand that the same principles could be applied to intra prediction methods as well.

In an embodiment (not shown), the encoder or decoder of any one of FIGS. 17 and 19-23 may calculate both a BVD*.x and a BVD*.y in each scenario and determine whether using one of either BVD*.x or BVD*.y would result in a more efficient method for encoding, storing, signaling, and decoding image and video sequence data.

Figure 24:
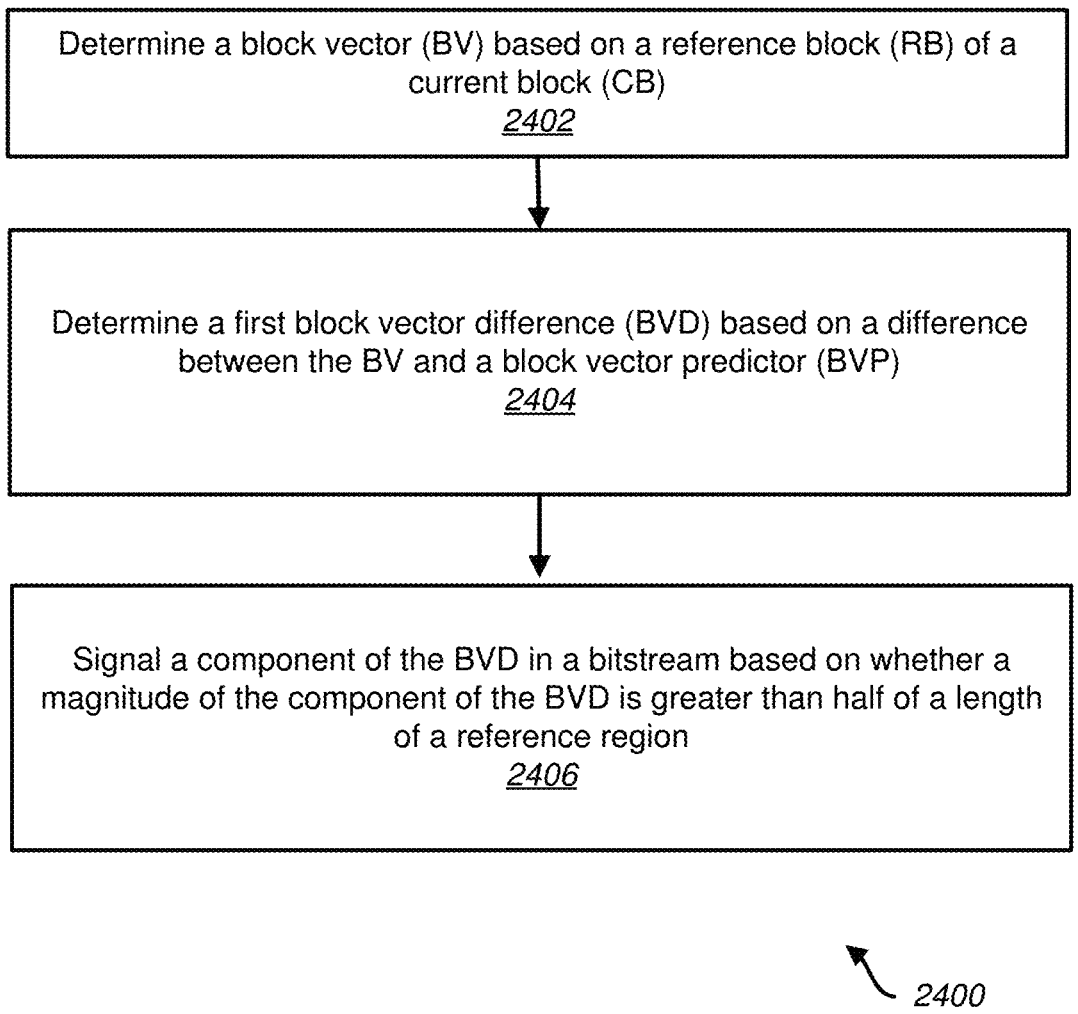
FIG. 24 illustrates a flowchart of a method for encoding an IBC vector difference wrap around procedure in accordance with embodiments of the present disclosure.

FIG. 24 illustrates a flowchart 2400 of a method for encoding an IBC vector difference wrap around procedure in accordance with embodiments of the present disclosure. The method of flowchart 2400 may be implemented by an encoder, such as encoder 200 in FIG. 2.

The method of flowchart 2400 begins at 2402. At 2402, the encoder may determine a block vector (BV) based on a reference block (RB) of a current block (CB).

At step 2404, the encoder may determine a first block vector difference (BVD) based on a difference between the BV and a block vector predictor (BVP).

Figure 25:
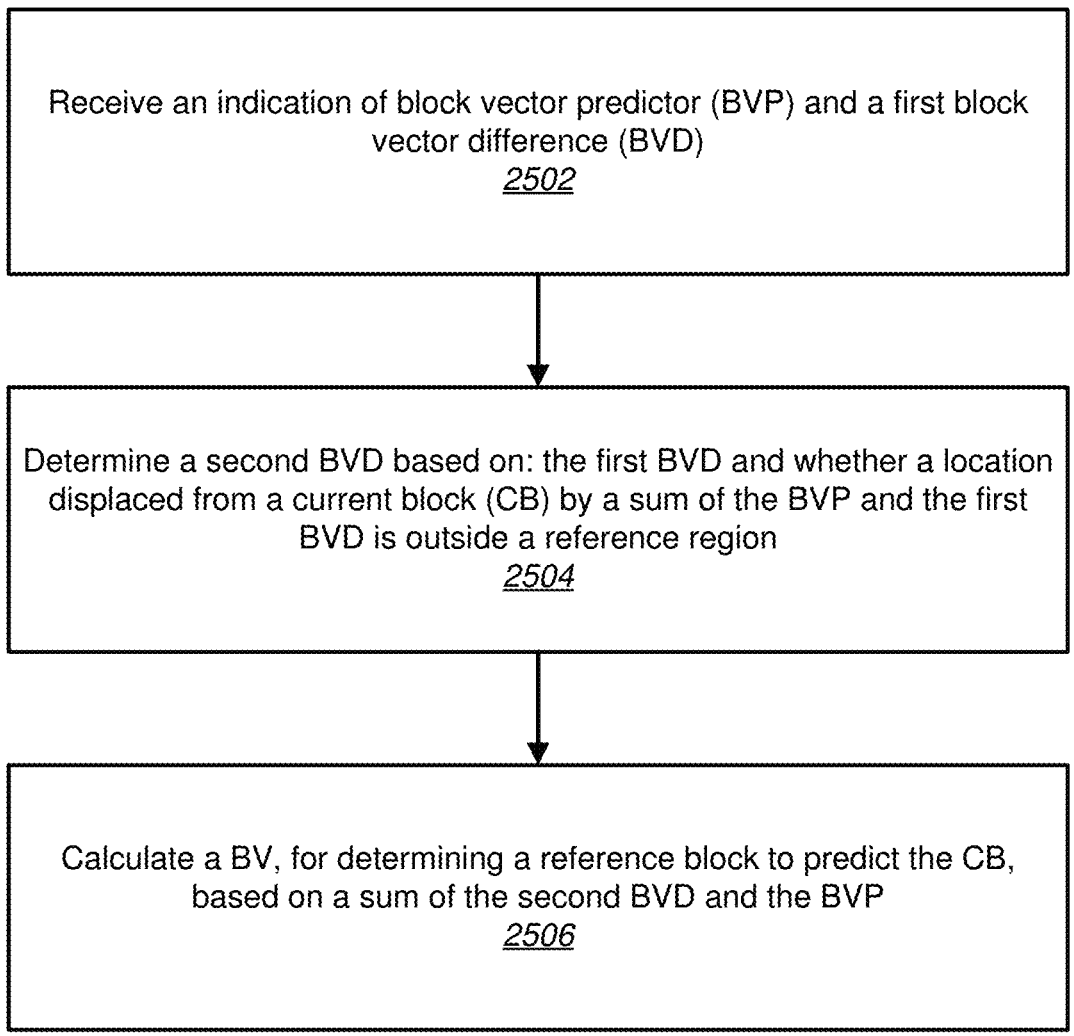
FIG. 25 illustrates a flowchart of a method for decoding an IBC vector difference wrap around procedure in accordance with embodiments of the present disclosure.

At step 2406 the encoder may signal the component (BVD.x, BVD*.x, BVD.y, or BVD*y) of the BVD in a bitstream, based on whether a magnitude of the component of the BVD is greater than half of a length of a reference region FIG. 25 illustrates a flowchart 2500 of a method for decoding an IBC vector difference wrap around procedure in accordance with embodiments of the present disclosure. The method of flowchart 2500 may be implemented by a decoder, such as decoder 300 in FIG. 3.

The method of flowchart 2500 begins at 2502. At 2502, the decoder may receive an indication of block vector predictor (BVP) and a first block vector difference (BVD).

At step 2504, the decoder may determine a second BVD based on: the first BVD and whether a location displaced from a current block (CB) by a sum of the BVP and the first BVD is outside a reference region. In an embodiment, the decoder may further determine the second BVD as the first BVD based on the location being within a reference region (e.g., a reference region for predicting the CB).

In an embodiment, determining the second BVD further comprises determining, based on the location being outside the reference region, a first component of the second BVD with: a second magnitude determined based on a difference between a length of the reference region and the magnitude of a first component of the first BVD.

At step 2506, the decoder may calculate a BV, for determining a prediction block to predict the CB, based on a sum of the second BVD and the BVP.

Figure 26:
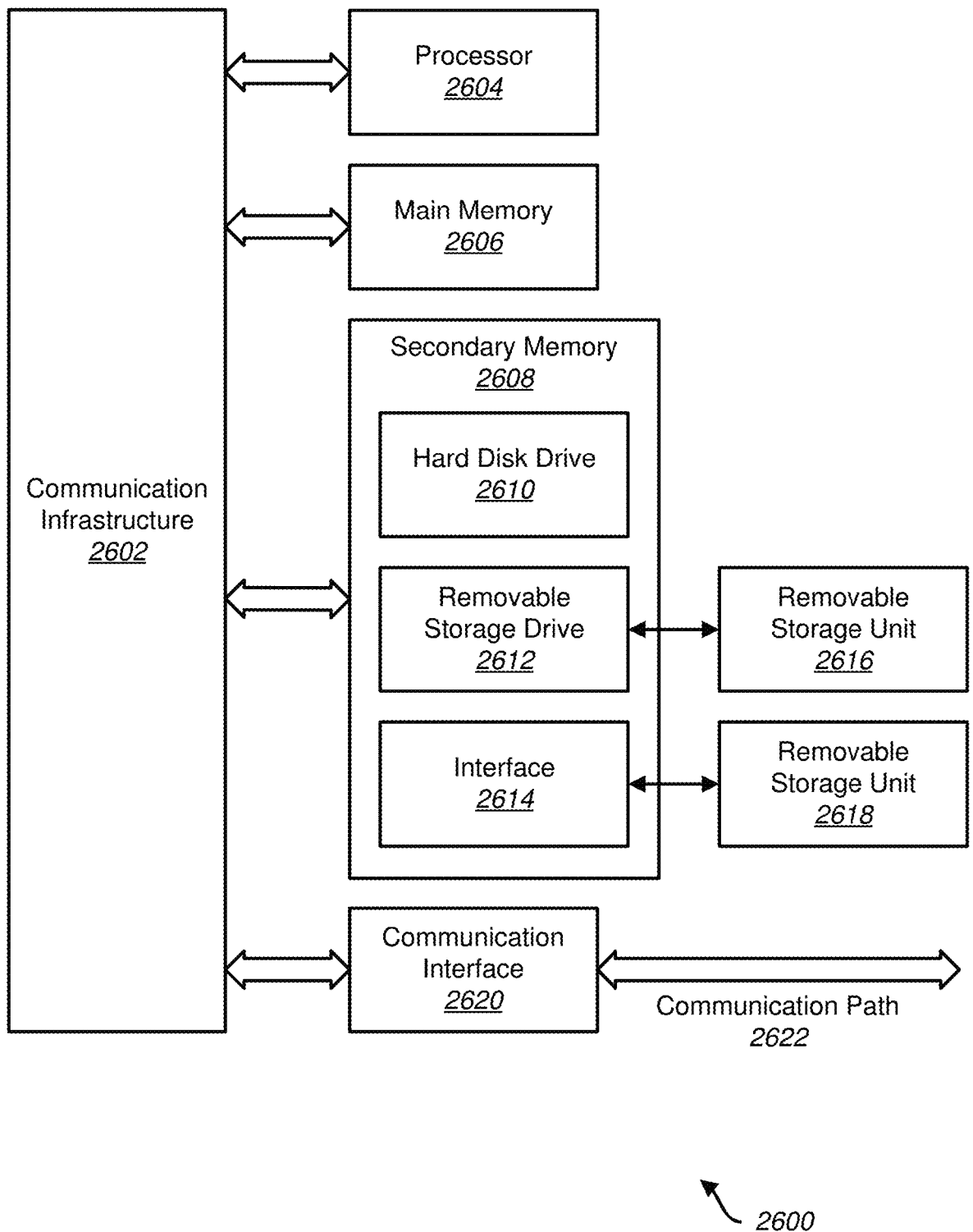
FIG. 26 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2600 is shown in FIG. 26. Blocks depicted in the figures above, such as the blocks in FIGS. 1, 2, and 3, may execute on one or more computer systems 2600. Furthermore, each of the steps of the flowcharts depicted in this disclosure may be implemented on one or more computer systems 2600.

Computer system 2600 includes one or more processors, such as processor 2604. Processor 2604 may be, for example, a special purpose processor, general purpose processor, microprocessor, or digital signal processor. Processor 2604 may be connected to a communication infrastructure 2602 (for example, a bus or network). Computer system 2600 may also include a main memory 2606, such as random access memory (RAM), and may also include a secondary memory 2608.

Secondary memory 2608 may include, for example, a hard disk drive 2610 and/or a removable storage drive 2612, representing a magnetic tape drive, an optical disk drive, or the like. Removable storage drive 2612 may read from and/or write to a removable storage unit 2616 in a well-known manner. Removable storage unit 2616 represents a magnetic tape, optical disk, or the like, which is read by and written to by removable storage drive 2612. As will be appreciated by persons skilled in the relevant art(s), removable storage unit 2616 includes a computer usable storage medium having stored therein computer software and/or data.

In alternative implementations, secondary memory 2608 may include other similar means for allowing computer programs or other instructions to be loaded into computer system 2600. Such means may include, for example, a removable storage unit 2618 and an interface 2614. Examples of such means may include a program cartridge and cartridge interface (such as that found in video game devices), a removable memory chip (such as an EPROM or PROM) and associated socket, a thumb drive and USB port, and other removable storage units 2618 and interfaces 2614 which allow software and data to be transferred from removable storage unit 2618 to computer system 2600.

Computer system 2600 may also include a communications interface 2620. Communications interface 2620 allows software and data to be transferred between computer system 2600 and external devices. Examples of communications interface 2620 may include a modem, a network interface (such as an Ethernet card), a communications port, etc. Software and data transferred via communications interface 2620 are in the form of signals which may be electronic, electromagnetic, optical, or other signals capable of being received by communications interface 2620. These signals are provided to communications interface 2620 via a communications path 2622. Communications path 2622 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2616 and 2618 or a hard disk installed in hard disk drive 2610. These computer program products are means for providing software to computer system 2600. Computer programs (also called computer control logic) may be stored in main memory 2606 and/or secondary memory 2608. Computer programs may also be received via communications interface 2620. Such computer programs, when executed, enable the computer system 2600 to implement the present disclosure as discussed herein. In particular, the computer programs, when executed, enable processor 2604 to implement the processes of the present disclosure, such as any of the methods described herein. Accordingly, such computer programs represent controllers of the computer system 2600.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the art.

What is claimed is:

1. A method comprising:
   receiving, from a bitstream, an indication of a block vector predictor (BVP) and a first block vector difference (BVD) for a current block;
   based on a location, displaced from the current block by a sum of the BVP and the first BVD, being outside a reference region:
   selecting one component of the first BVD to adjust;
   determining a first component, of a second BVD and corresponding to the selected component of the first BVD, to be equal to the adjusted component of the first BVD; and
   determining a second component of the second BVD to be equal to a non-selected component of the first BVD;
   calculating a block vector (BV) based on a sum of the second BVD and the BVP; and
   reconstructing the current block based on a reference block indicated by the BV.

2. The method of claim 1, wherein the reference region comprises a plurality of rows and a plurality of columns, and wherein:
   at least one row of the plurality of rows has a different length than that of another row of the plurality of rows; or
   at least one column of the plurality of columns has a different length than that of another column of the plurality of columns.

3. The method of claim 1, wherein the first component of the second BVD is determined as having:
   a magnitude based on a difference between a length of the reference region and a magnitude of the selected component of the first BVD; and
   a sign opposite of that of the selected component of the first BVD.

4. The method of claim 3, wherein the length of the reference region is along a direction of the selected component of the first BVD.

5. The method of claim 4, wherein the direction is horizontal based on the selected component being a horizontal component and the direction is vertical based on the selected component being a vertical component.

6. The method of claim 1, wherein the selected component of the first BVD is in a direction that results in a magnitude of the adjusted component of the first BVD being greater than half the length of the reference region.

7. The method of claim 6, wherein the length of the reference region is along a horizontal direction based on the selected component of the first BVD being a horizontal component, and wherein the length of the reference region is along a vertical direction based on the selected component of the first BVD being a vertical component.

8. A video decoder comprising:
one or more processors; and
memory storing instructions that, when executed by the one or more processors, cause the video decoder to:
receive, from a bitstream, an indication of a block vector predictor (BVP) and a first block vector difference (BVD) for a current block;
based on a location, displaced from the current block by a sum of the BVP and the first BVD, being outside a reference region:
select one component of the first BVD to adjust;
determine a first component, of a second BVD and corresponding to the selected component of the first BVD, to be equal to the adjusted component of the first BVD; and
determine a second component of the second BVD to be equal to a non-selected component of the first BVD;
calculate a block vector (BV) based on a sum of the second BVD and the BVP; and
reconstruct the current block based on a reference block indicated by the BV.

9. The video decoder of claim 8, wherein the reference region comprises a plurality of rows and a plurality of columns, and wherein:
at least one row of the plurality of rows has a different length than that of another row of the plurality of rows; or
at least one column of the plurality of columns has a different length than that of another column of the plurality of columns.

10. The video decoder of claim 8, wherein the first component of the second BVD is determined as having:
a magnitude based on a difference between a length of the reference region and a magnitude of the selected component of the first BVD; and
a sign opposite of that of the selected component of the first BVD.

11. The video decoder of claim 10, wherein the length of the reference region is along a direction of the selected component of the first BVD.

12. The video decoder of claim 11, wherein the direction is horizontal based on the selected component being a horizontal component and the direction is vertical based on the selected component being a vertical component.

13. The video decoder of claim 8, wherein the selected component of the first BVD is in a direction that results in a magnitude of the adjusted component of the first BVD being greater than half the length of the reference region.

14. The video decoder of claim 13, wherein the length of the reference region is along a horizontal direction based on the selected component of the first BVD being a horizontal component, and wherein the length of the reference region is along a vertical direction based on the selected component of the first BVD being a vertical component.

15. A non-transitory computer-readable medium comprising instructions that, when executed by one or more processors of a decoder, cause the decoder to:
receive, from a bitstream, an indication of a block vector predictor (BVP) and a first block vector difference (BVD) for a current block;
based on a location, displaced from the current block by a sum of the BVP and the first BVD, being outside a reference region:
select one component of the first BVD to adjust;
determine a first component, of a second BVD and corresponding to the selected component of the first BVD, to be equal to the adjusted component of the first BVD; and
determine a second component of the second BVD to be equal to a non-selected component of the first BVD;
calculate a block vector (BV) based on a sum of the second BVD and the BVP; and
reconstruct the current block based on a reference block indicated by the BV.

16. The non-transitory computer-readable medium of claim 15, wherein the first component of the second BVD is determined as having with:
a magnitude based on a difference between a length of the reference region and a magnitude of the selected component of the first BVD; and
a sign opposite of that of the selected component of the first BVD.

17. The non-transitory computer-readable medium of claim 16, wherein the length of the reference region is along a direction of the selected component of the first BVD.

18. The non-transitory computer-readable medium of claim 17, wherein the direction is horizontal based on the selected component being a horizontal component and the direction is vertical based on the selected component being a vertical component.

19. The non-transitory computer-readable medium of claim 15, wherein the selected component of the first BVD is in a direction that results in a magnitude of the adjusted component of the first BVD being greater than half the length of the reference region.

20. The non-transitory computer-readable medium of claim 19, wherein the length of the reference region is along a horizontal direction based on the selected component of the first BVD being a horizontal component, and wherein the length of the reference region is along a vertical direction based on the selected component of the first BVD being a vertical component.

* * * * *